US008746432B2

(12) United States Patent
May et al.

(10) Patent No.: US 8,746,432 B2
(45) Date of Patent: Jun. 10, 2014

(54) AUTOMATED CLIPPING PACKAGING APPARATUS AND ASSOCIATED DEVICES, METHODS, SYSTEMS AND COMPUTER PROGRAM PRODUCTS SUITABLE FOR PACKAGING WHOLE MUSCLE

(75) Inventors: Dennis J. May, Pittsboro, NC (US); Samuel D. Griggs, Raleigh, NC (US); Matthew D. Lowder, Durham, NC (US); Thomas E. Whittlesey, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 843 days.

(21) Appl. No.: 12/777,614

(22) Filed: May 11, 2010

(65) Prior Publication Data
US 2010/0287883 A1 Nov. 18, 2010

Related U.S. Application Data

(60) Provisional application No. 61/178,150, filed on May 14, 2009.

(51) Int. Cl.
*B65G 11/00* (2006.01)
*B65G 11/02* (2006.01)
*B30B 7/04* (2006.01)

(52) U.S. Cl.
CPC *B65G 11/023* (2013.01); *B30B 7/04* (2013.01)
USPC .......................................... 193/15; 100/232

(58) Field of Classification Search
USPC ............... 193/15; 100/215, 218, 232, 233
See application file for complete search history.

(56) References Cited

U.S. PATENT DOCUMENTS

| 1,218,314 | A | * | 3/1917 | Read ................................ 53/114 |
| 2,029,984 | A | * | 2/1936 | Buttfield et al. .............. 100/343 |
| 2,847,810 | A | * | 8/1958 | Davey et al. ..................... 53/590 |
| 3,040,654 | A | * | 6/1962 | Opie .............................. 100/347 |
| 3,389,533 | A | | 6/1968 | Tipper et al. |
| 3,455,084 | A | * | 7/1969 | Broersma et al. ............... 53/529 |
| 3,499,259 | A | | 3/1970 | Tipper et al. |
| 3,524,297 | A | * | 8/1970 | Pedersen et al. ................. 53/432 |
| 3,548,890 | A | * | 12/1970 | Langen ............................. 141/7 |
| 3,854,391 | A | * | 12/1974 | Ackroyd ........................ 99/349 |
| 4,086,850 | A | * | 5/1978 | Becker et al. ................... 100/42 |
| 4,205,604 | A | * | 6/1980 | Ashley ............................ 100/95 |
| 4,516,387 | A | | 5/1985 | Kupcikevicius |
| 4,602,472 | A | * | 7/1986 | Ampolini et al. ............... 53/438 |

(Continued)

OTHER PUBLICATIONS

International Search Report and Written Opinion for corresponding PCT application No. PCT/US2010/033505, date of mailing Feb. 28, 2011.

*Primary Examiner* — William R Harp
(74) *Attorney, Agent, or Firm* — Myers Bigel Sibley & Sajovec, P.A.

(57) ABSTRACT

Methods, devices and computer program products automatically package an object, such as, for example, whole muscle meat pieces, in a covering material, such as, for example, netting. The devices include a loading chute having a ceiling or door having at least a portion configured to open and close and a floor underlying and in cooperating alignment with the ceiling. The ceiling and floor are configured to cooperate to encase a product chamber with an axially extending open channel therebetween. At least one of the floor and ceiling reciprocates in a substantially vertical direction between a first loading position corresponding to when the ceiling is open and a second operative position corresponding to when the ceiling is closed.

19 Claims, 34 Drawing Sheets

(56) References Cited

U.S. PATENT DOCUMENTS

| | | |
|---|---|---|
| 4,683,700 A | 8/1987 | Evans et al. |
| 4,833,863 A * | 5/1989 | Scott et al. ............. 53/438 |
| 5,042,234 A | 8/1991 | Evans et al. |
| 5,161,347 A | 11/1992 | May et al. |
| 5,381,725 A * | 1/1995 | Breunig et al. ............. 99/349 |
| 2006/0021292 A1 | 2/2006 | Norton et al. |
| 2006/0277868 A1 | 12/2006 | May et al. |
| 2008/0000196 A1 | 1/2008 | May et al. |
| 2008/0236103 A1 | 10/2008 | Lowder et al. |
| 2008/0250755 A1 | 10/2008 | Griggs et al. |

* cited by examiner

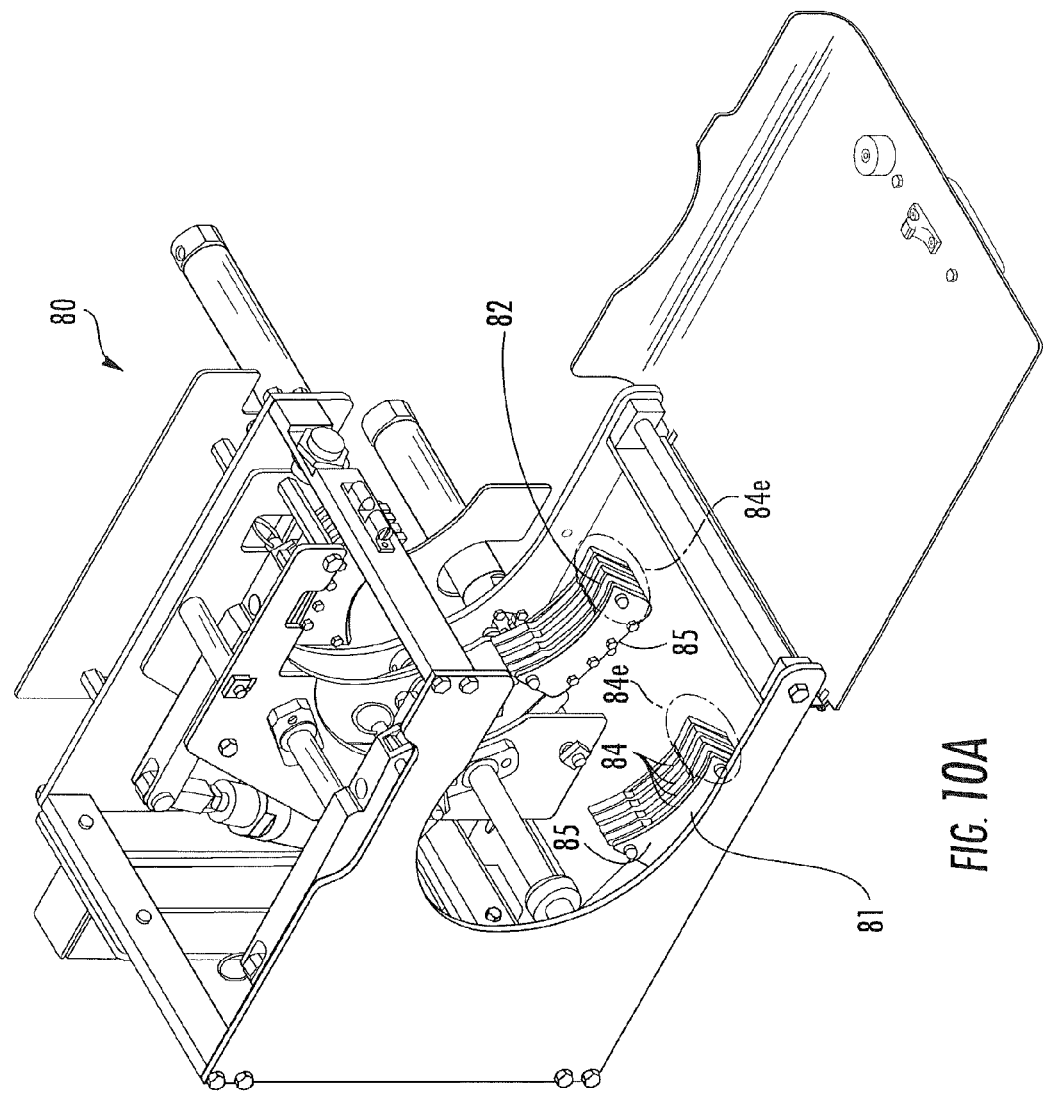

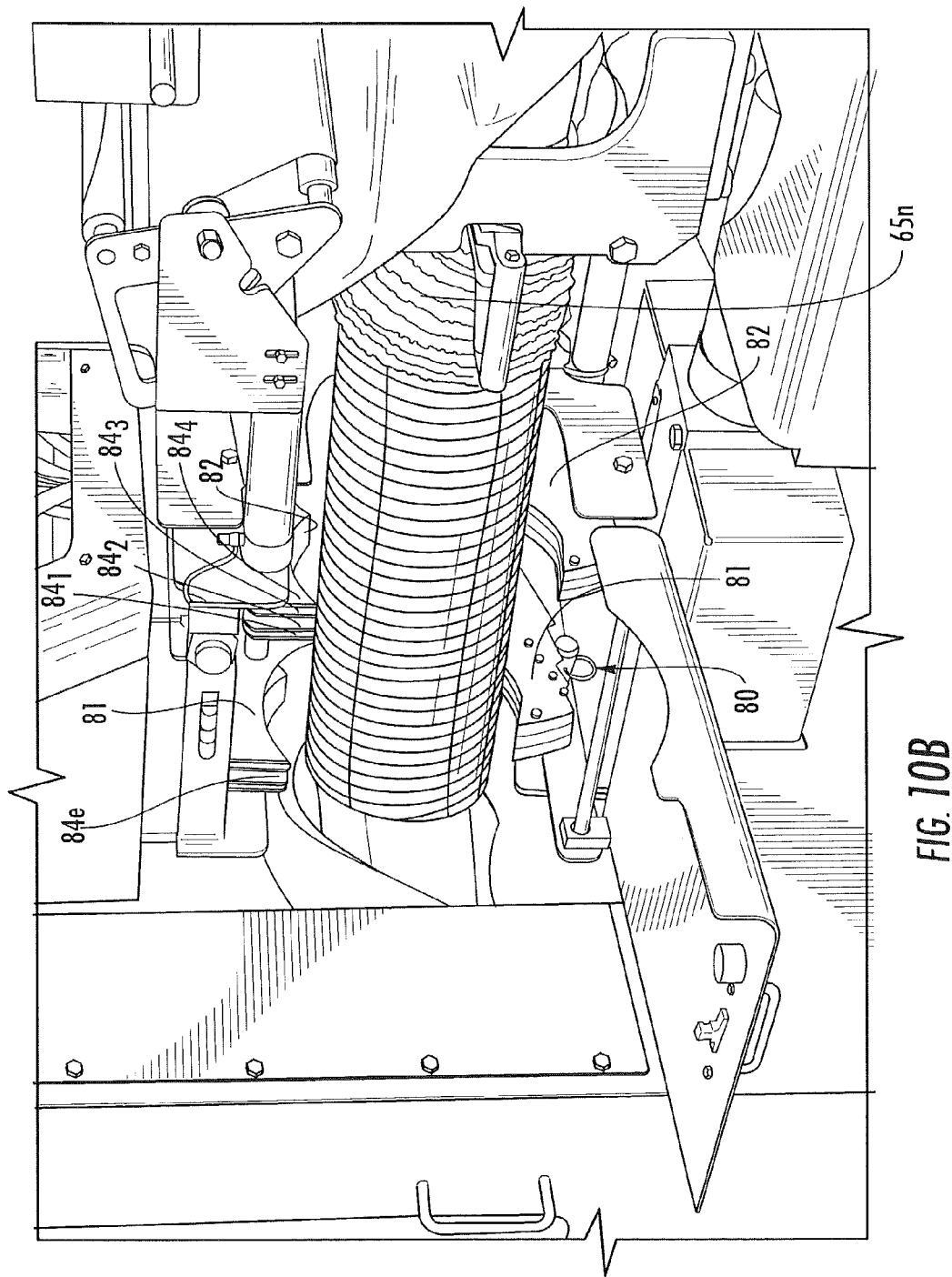

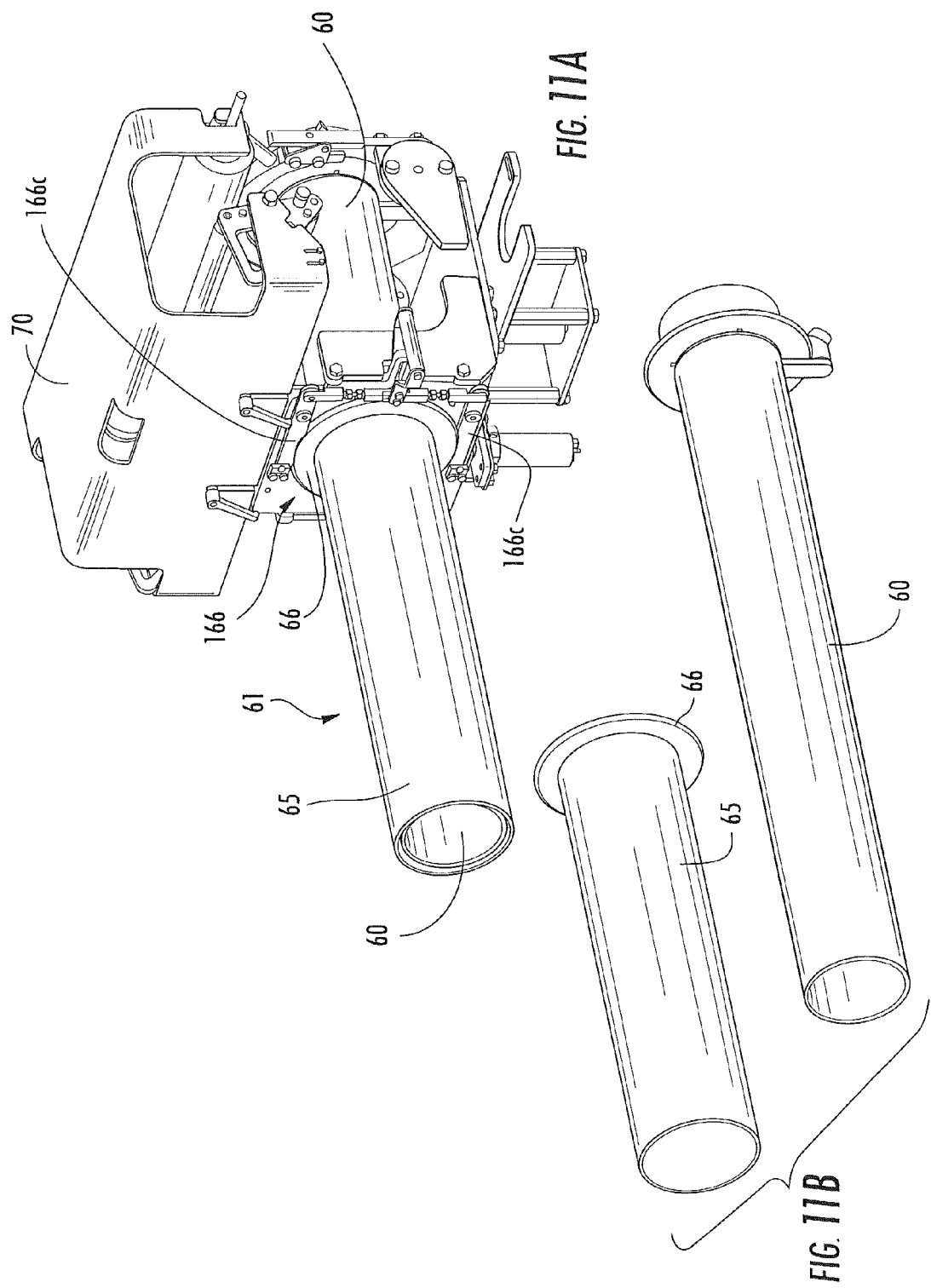

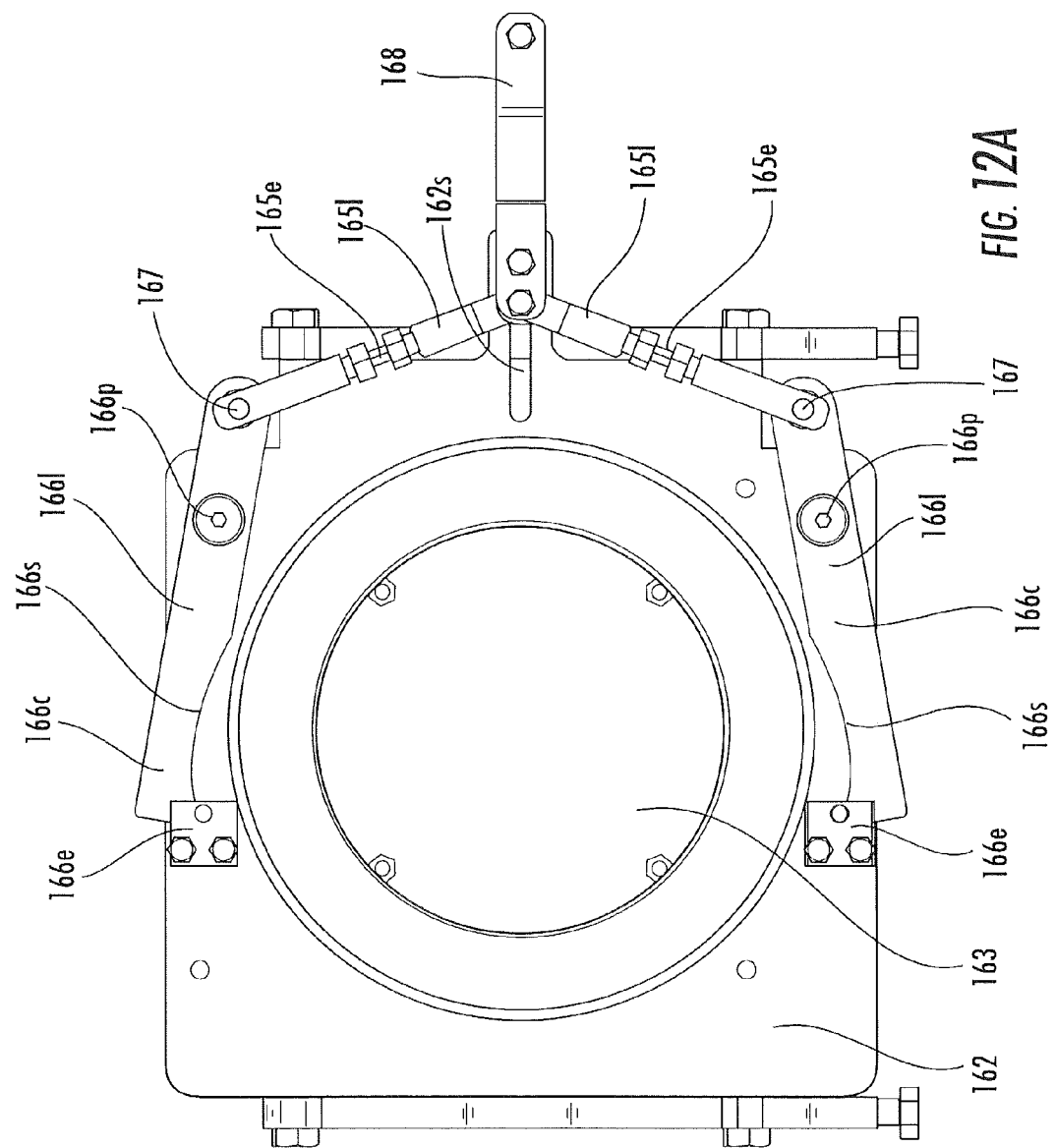

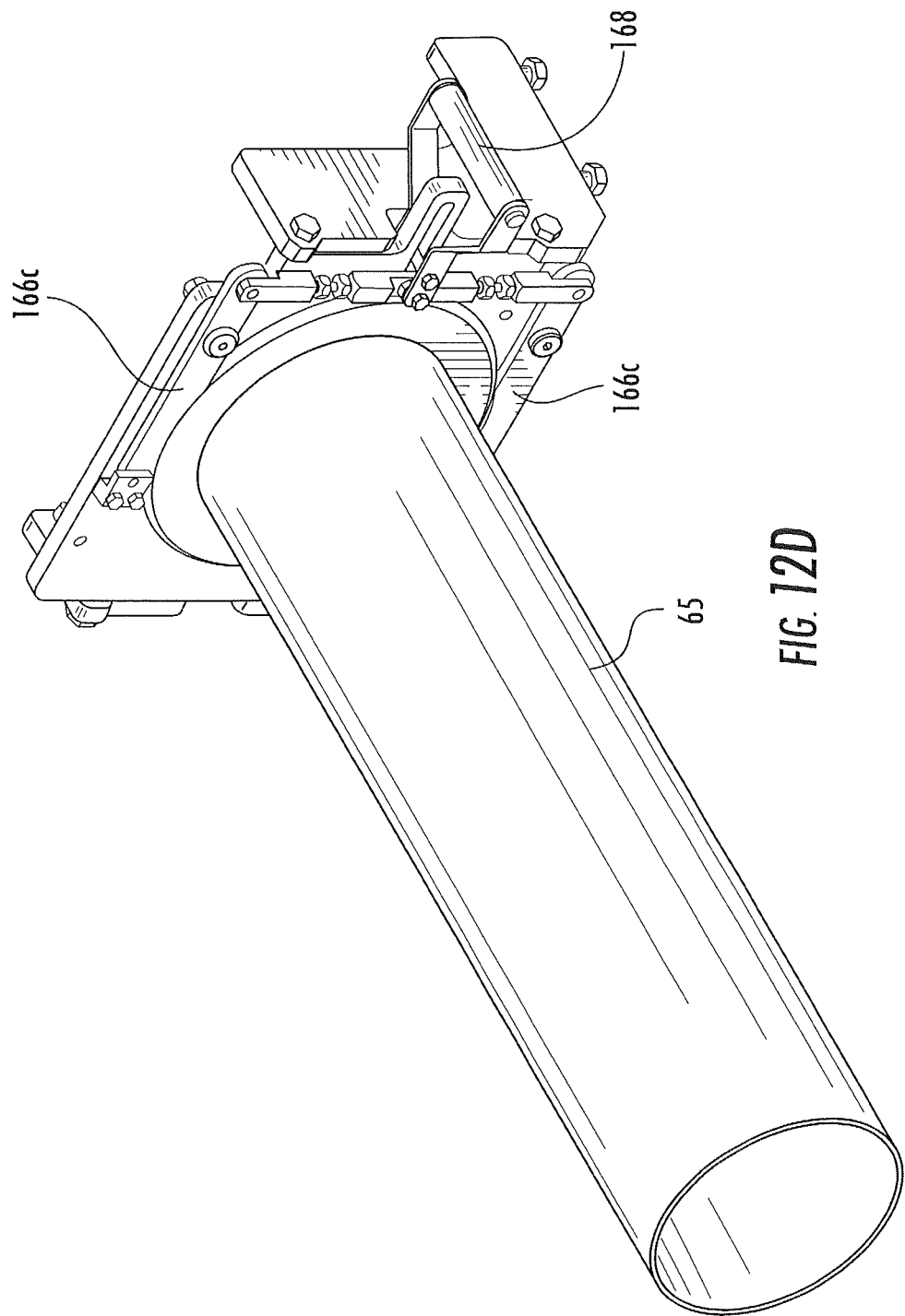

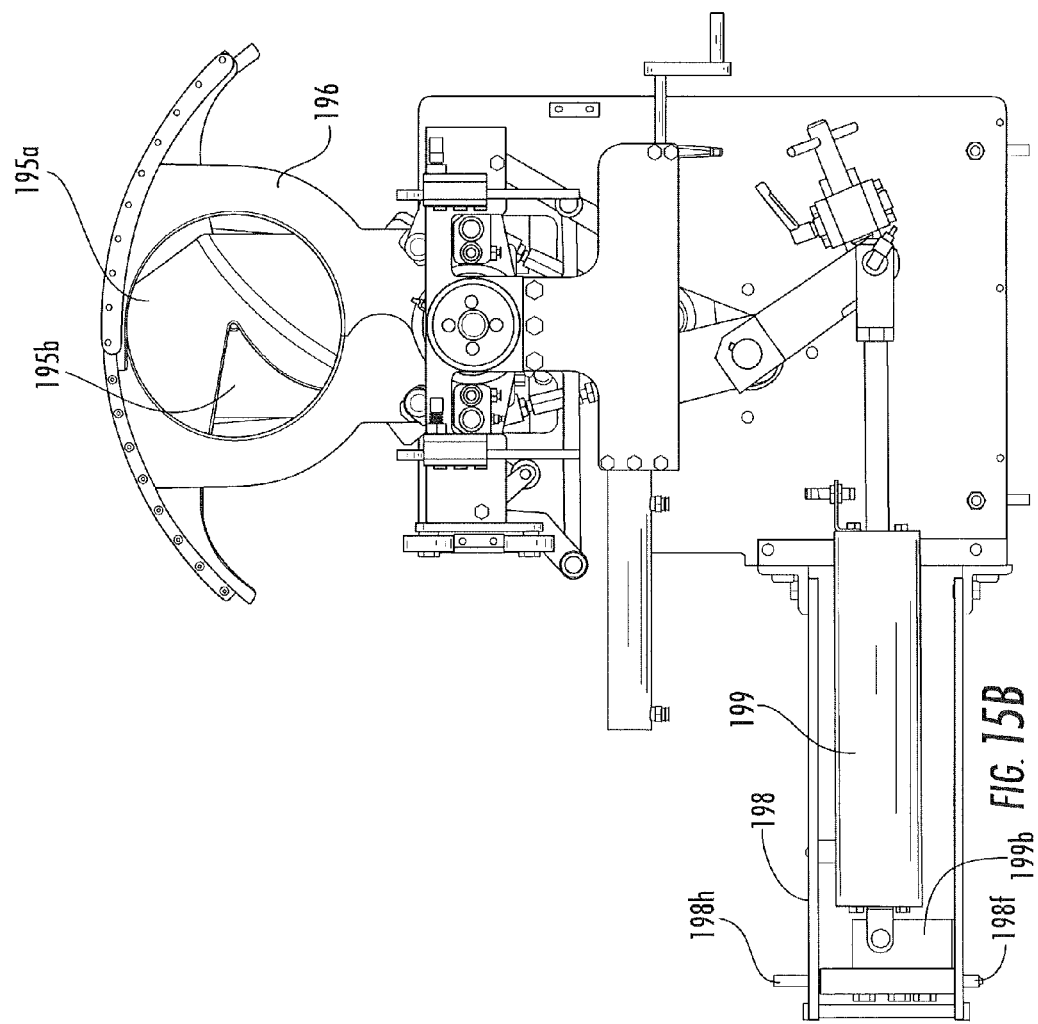

AUTOMATED CLIPPING PACKAGING APPARATUS AND ASSOCIATED DEVICES, METHODS, SYSTEMS AND COMPUTER PROGRAM PRODUCTS SUITABLE FOR PACKAGING WHOLE MUSCLE

RELATED APPLICATIONS

This application claims the benefit of and priority to U.S. Provisional Application Ser. No. 61/178,150 filed May 14, 2009, the contents of which are hereby incorporated by reference as if recited in full herein.

FIELD OF THE INVENTION

The present invention relates to apparatus that can package materials that enclose products therein, and may be particularly suitable for enclosing discrete pieces of whole muscle in clipped netting material.

BACKGROUND OF THE INVENTION

Certain types of commodity and/or industrial items can be packaged by placing the desired product(s) in a covering material, then applying a closure clip or clips to end portions of the covering material to secure the product(s) therein. For non-flowable piece goods, the piece goods can be held individually in a respective clipped package, or as a group of discrete or integrated (e.g., compressed) goods in a single package. The covering material can be any suitable material, typically a casing and/or netting material.

For example, the systems include a netting chute that holds a length of a netting sleeve over the exterior thereof. A first downstream end portion of the netting is typically gathered and clipped closed using a first clip. As the product exits the netting chute, it is covered with the netting. The leading and trailing edges of netting can be gathered (upstream of the product) and clipped, typically using a Tipper Tie® single or double clippers. Clipping mechanisms or "clippers" are well known to those of skill in the art and include those available from Tipper Tie, Inc., of Apex, N.C., including product numbers Z4, Z3214, Z3202, and Z3200. Examples of clip attachment apparatus and/or packaging apparatus are described in U.S. Pat. Nos. 3,389,533; 3,499,259; 4,683,700; and 5,161,347, and U.S. Patent Application Publication No. 2008/0000196, the contents of which are hereby incorporated by reference as if recited in full herein.

SUMMARY OF EMBODIMENTS OF THE INVENTION

Embodiments of the present invention provide apparatus, subassemblies and/or other devices, systems, methods and computer program products for loading and/or packaging target product.

Some embodiments of the invention are directed to methods, systems and devices that can automatically or semi-automatically package a product in a covering material, such as, for example, netting, and apply clips thereto.

Some embodiments are directed to loading chutes for a packaging system. The loading chutes include: a ceiling having at least a portion configured to open and close; and a floor underlying and in cooperating alignment with the ceiling, wherein, in a closed operative position, the ceiling and floor are configured to encase a product chamber with an axially extending open channel therebetween. At least one of the floor and ceiling reciprocates in a substantially vertical direction between a first loading position corresponding to when at least a portion of the ceiling is open and a second operative position corresponding to when the ceiling is closed to form the axially extending open channel.

In particular embodiments, the floor vertically reciprocates and when in the first loading position, the floor resides a distance below the second operative position of the floor.

Other embodiments are directed to packaging systems. The systems include: (a) a frame; (b) a loading chute attached to the frame, the loading chute having a product chamber with a floor that vertically reciprocates; (c) an elongate netting chute in communication with the loading chute attached to the frame, the netting chute having an outer surface and opposing receiving and discharge end portions with an interior cavity extending therethrough, the netting chute having an axial centerline; (d) an elongate product chute attached to the frame, the product chute having opposing receiving and discharge ends, the product chute residing at least partially in the interior cavity of the netting chute, wherein, in operative position, the product chute is axially aligned with and disposed downstream of the loading chute; and (e) a clipper mechanism disposed downstream of the netting chute in cooperating alignment therewith, the clipper mechanism configured to apply at least one clip to a netting material that encloses the product after the product exits the product chute.

The system can be configured to releasably serially attach respective pairs of ceiling and floors defining corresponding different product chamber diameters of the loading chute to the frame, the respective pairs provided in user selectable sizes for target products in a range of sizes that are between about 2-9 inches in diameter.

The system may include a pair of spaced apart upwardly extending sidewalls that reside on opposing sides of the product chamber and define part of the product chamber in a loading configuration, wherein the ceiling of the selected ceiling and floor pair pivotably attaches to an upper portion of one of the upwardly extending sidewalls, and wherein the sidewalls are laterally adjustable to accommodate different diameter sized ceiling and floor pairs between about 3 inches to about 8 inches.

Other embodiments are directed to methods of loading target product for packaging. The methods include: (a) vertically moving a floor of a loading chute downward from an operative position; (b) loading target product into the loading chute while a ceiling of the product chute is open; (c) closing the ceiling of the loading chute; then (d) programmatically directing the floor of the loading chute to move upward to close against the ceiling and define a substantially cylindrical product chamber; and (e) compressing the target product held in the product chamber in response to directing the floor to move upward.

Still other embodiments are directed to methods of loading target product for packaging. The methods include: (a) vertically extending upwardly projecting sidewalls attached to a ceiling of a loading chute from an operative position; (b) loading target product into the loading chute while the ceiling of the product chute is open and the sidewalls are extended; (c) closing the ceiling of the loading chute; then (d) automatically vertically moving the sidewalls and ceiling of the loading chute downward to toward the floor to define a substantially cylindrical product chamber; and (e) compressing the target product held in the product chamber in response to vertically moving the ceiling downward.

Some embodiments are directed to methods of loading discrete pieces of whole muscle in a packaging system. The methods include: (a) providing a loading chute having a product chamber with a ceiling and a vertically reciprocating floor; (b) moving the floor in a downward direction to a loading position; (c) pivoting the ceiling of a loading chute to an open position; (d) loading whole muscle in the loading chute product chamber when the ceiling is open; (e) closing the ceiling; (f) electronically locking the ceiling closed; then (g) automatically moving the floor upward toward the ceiling to compress the whole muscle in the product chamber; and then (h) automatically extending a pusher mechanism with a pusher head to push the compressed whole muscle out of the product chamber.

Still other embodiments are directed to computer program products for operating an automated or semi-automated netting system. The computer program product includes a computer readable storage medium having computer readable program code embodied in the medium. The computer-readable program code including: (a) computer readable program code that monitors at least one signal from a loading chute having a product chamber with a ceiling and floor, at least one of which is vertically reciprocating to allow for easier loading of product into the product chamber when the ceiling is open; and (b) computer readable program code that automatically directs an actuator to move at least one of the ceiling or floor vertically to an operative position after signal data confirms that the ceiling is closed.

Yet other embodiments are directed to an easy-load horn assembly for a packaging device. The assembly includes: (a) a first elongate horn having an axially extending tube with a first diameter with a through-cavity, the horn having a length with opposing first and second ends, wherein one end has a circumferentially extending beveled flange with a larger second diameter; and (b) a mounting bracket with upper and lower clamps having an arcuate shape, the upper and lower clamps configured to receive a respective upper and lower portion of the circumferentially extending beveled flange to releasably lock the chute in position. The upper and lower clamps each have an end portion that is pivotably attached to a respective upper and lower surface of the mounting bracket.

In some embodiments, the mounting bracket is configured to interchangeably hold a plurality of different horns, each horn having a tube portion with a different diameter between about 3-8 inches, and each horn having an end with a circumferentially beveled flange with the same diameter.

In some embodiments, the assembly includes a second elongate horn configured to interchangeably mount to the mounting bracket, the second horn having an axially extending tube with a diameter with a through-cavity that is different than the first horn, and wherein the second horn has a length with opposing first and second ends, wherein one end of the second horn has the same circumferentially extending beveled flange with the same diameter as the first horn.

Still other embodiments are directed to a clipper mechanism assembly that includes: (a) a clipper mechanism; (b) a frame holding the clipper mechanism; (c) a housing surrounding the frame enclosing at least a portion of the clipper mechanism; (d) voiders in communication with the clipper mechanism mounted to the frame; (e) an externally accessible bracket that extends outward from the housing and is attached to the frame; and (f) a voider actuator that is in communication with and moves the voiders together and retracts them apart, wherein the voider actuator has a mounting body attached to an end portion thereof that is held by the bracket to allow the voider actuator to be moved to one of a plurality of different defined lateral positions so that the voiders have different home positions according to a desired target size product whereby the voider actuator has a smaller stroke cycle for smaller products and a larger stroke cycle for larger products.

The bracket can have spaced apart upper and lower plates, each with pairs of apertures, each lateral defined position corresponding to a pair of apertures aligned on the top and bottom plates. The mounting body can have a pair of downwardly extending channels. The bracket can include an upwardly extending handle with downwardly projecting tines that extend through the apertures on the top plate, the channels of the mounting body, and corresponding aligned apertures in the bottom plate that allow a user to remove the handle with the tines, move the mounting body to a desired lateral location, then insert the handle with the tines to lock the actuator in position.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 10A is an end perspective view of a braking module with a multi-edge grip surface according to embodiments of the present invention.

FIG. 10B is a side perspective view of the braking module shown in position over a netting chute according to embodiments of the present invention.

FIG. 11A is a side perspective view of a horn assembly with an easy-alignment mounting configuration according to embodiments of the present invention.

FIG. 11B is an exploded view of the product horn that nests inside the netting horn in the horn assembly shown in FIG. 11A.

FIG. 12A is an end view of a lock useful for releasably attaching horns according to embodiments of the present invention.

FIG. 12D is a side perspective view of the lock and horn shown in FIG. 12C illustrating the lock secured to the horn.

FIG. 15B is an end view of the clipper module shown in FIG. 15A illustrating the voider in a closed configuration and the actuator held at a first lateral position by the bracket according to embodiments of the present invention.

DESCRIPTION OF EMBODIMENTS OF THE INVENTION

Figure 1:
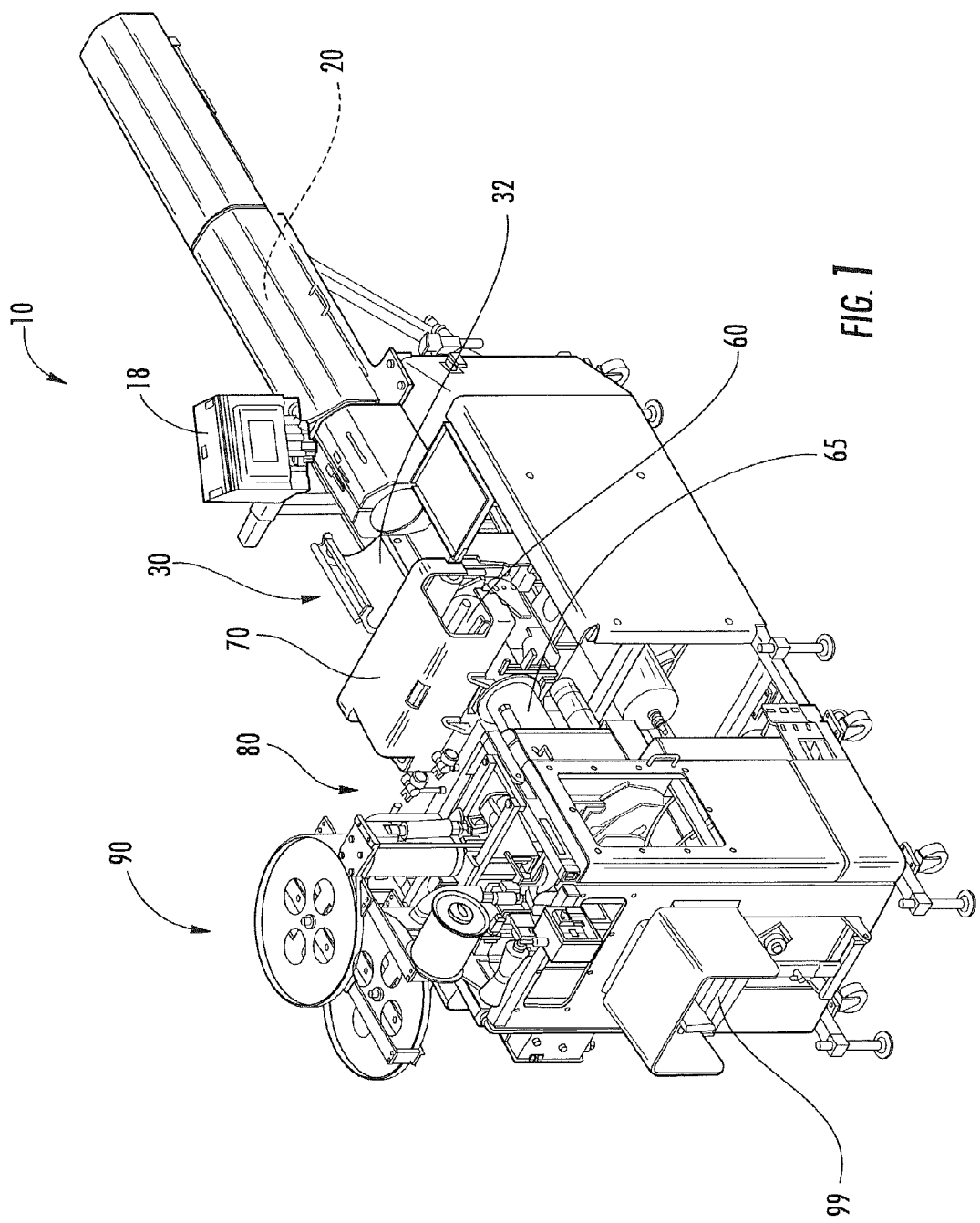
FIG. 1 is a perspective discharge end view of an apparatus/system used to automatically advance product through a product chute and then automatically apply at least one clip according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims or figures unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

In the description of embodiments of the present invention that follows, certain terms are employed to refer to the positional relationship of certain structures relative to other structures. As used herein, the terms "front," "forward" and derivatives thereof refer to the general or primary direction that a target product travels for enclosure and/or clipping; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

The term "frame" means a generally skeletal structure used to support one or more assemblies, modules and/or components. The frame may be one integral structure or a plurality of individual structures mountable to each other or a common floor structure or the like. The term "modular" means that a subassembly is designed with standardized dimensions, mounting features and/or configurations for interchangeable use with replacement modules of the same or similar type and/or other selected different modules. The term "module" can refer to an assembly or sub-assembly that includes certain components, features or devices that attach to the frame and carry out specified functions. However, the term "module" when used with respect to a controller or computer operation, refers to a circuit that includes computer program code. The frame and selected assemblies may also be configured for selectable mounting on a right or left hand side of a common frame or certain modules maybe configured for use with more than one packaging system. The terms "actuator" or "actuation cylinder" and derivatives thereof are used generically to indicate any type of automatically moveable actuation member, including for example, electric, pneumatic and hydraulic cylinders with rods. The term "breech" refers to the (side) entry of the product into the loading chute door/ceiling. The term "loading chute" may also be described as a "breech chute."

Embodiments of the present invention are particularly suitable for devices that cooperate with clippers to apply closure clips to objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material in any form including, for example, knotted, braided, extruded, stamped, knitted, woven or otherwise. Typically, the netting is configured so as to be stretchable in both axial and lateral directions.

Netting or other covering material may be used to package discrete meat products such as loaves of meat, boned ham, spiral sliced ham, deboned ham, turkey, turkey loaves held in molds, or other meat or items directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like, as well as non-food items. Examples of non-food items that may be packaged using embodiments of the present invention include living items such as flora, trees, dirt and the like, as well as inanimate objects. Additional examples of products include discrete, semi-solid or solid objects such as firewood, pet food (typically held in a container if the wet type), recreational objects (such as balls), or other solid or semi-solid objects. The product may be packaged for any suitable industry including horticulture, aquaculture, agriculture, or other food industry, environmental, chemical, explosive, or other application. Netting may be particularly useful to package whole muscle (uncooked meat), ham or turkeys, manufactured hardware such as automotive parts, firewood, explosives, molded products, and other industrial, consumable, and/or commodity item(s).

Generally stated, some particular embodiments of the present invention are directed at automating the packaging of discrete pieces of whole muscle meat product by automatically pushing pieces of the whole muscle (concurrently) through a product chute and wrapping or enveloping the objects at the other end of the chute in netting (e.g., "open net", so that the whole muscle therein is exposed to environmental conditions), then automatically or semi-automatically clipping the covering material with a closure clip or other attachment means to close the covering and hold the object or objects inside of the covering material. The packaging systems can optionally include a collagen food film forming module that forms a tubular protein layer over compressed whole muscle (e.g., COFFI material sold by Naturin) or other thin covering that is then covered by the netting.

The netted whole muscle may be in a single package or may be packaged in a series of linked packages (such as similar to "chubs"). The whole muscle may be processed so that protein migrates to or resides proximate an outer surface so that adjacent pieces of whole muscle may combine, attach, and/or bind when held in the netting during subsequent processing, without requiring any compression of the whole muscle during packaging in the netting. In other embodiments, whole muscle pieces can be compressed and packaged together, with or without a collagen film outer layer inside the netting. Where linked, the space between the actual netted product can have sufficient length to allow exposure (non-contact between adjacent netted product links) of adjacent ends of the netted whole muscle to processing conditions (such as smoke from a smoker).

Figure 2:
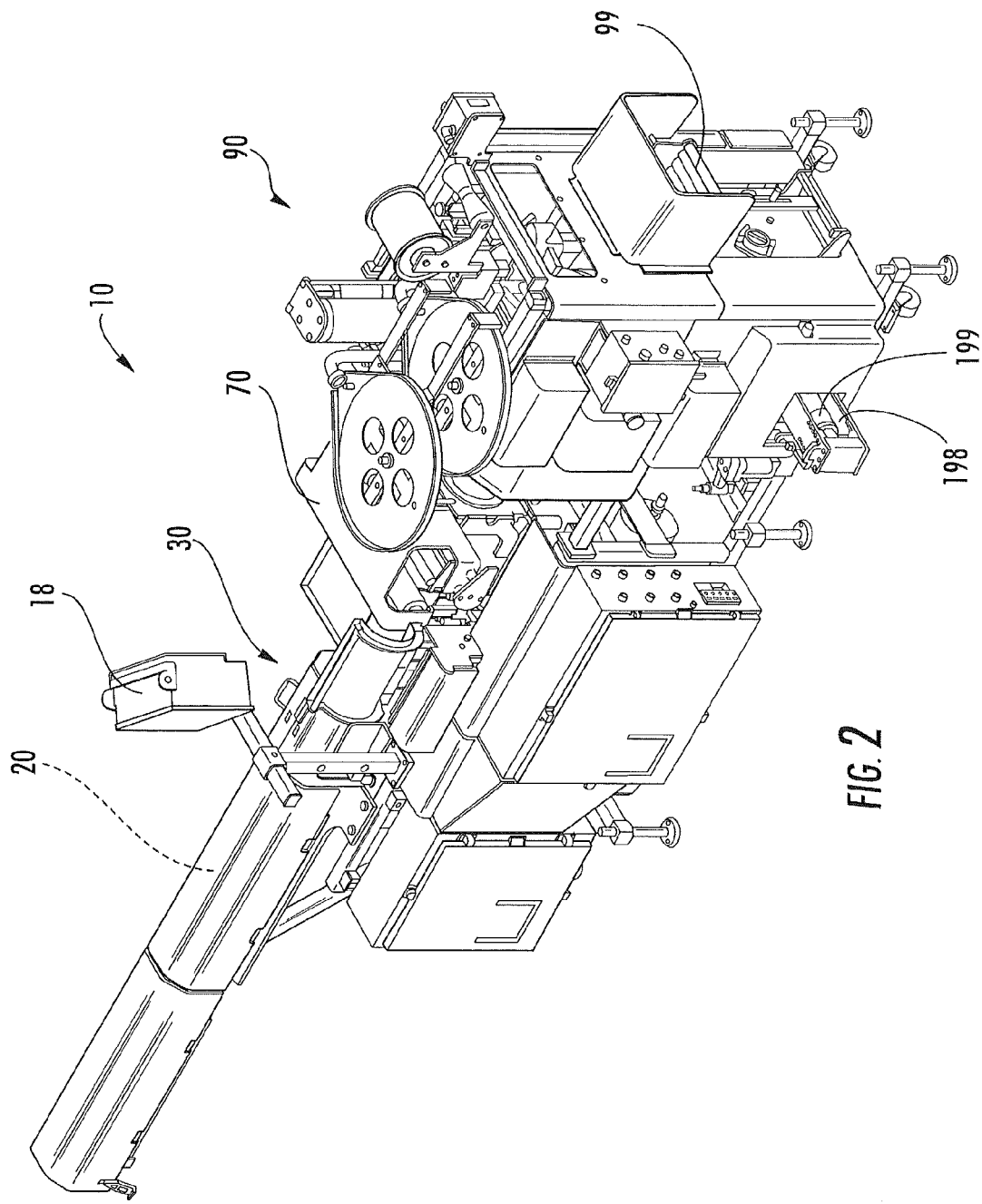
FIG. 2 is a perspective discharge end view of the opposing side of the apparatus/system shown in FIG. 1.

FIGS. 1-2 illustrate an exemplary automatic clipping packaging apparatus 10 according to embodiments of the present invention. As shown, the apparatus 10 may include one or more controllers 18, which may be incorporated into or communicate with an HMI (Human Machine Interface), an automated product pusher assembly or mechanism 20, a loading chute 30, a product chute 60, a netting chute 65, an optional protein or collagen film forming module 70, a braking module or assembly 80 (which may also function as a slack-fill assembly and/or derucker), a clipper module or assembly 90, and an optional discharge roller table 99.

FIG. 2 also shows that the system 10 can include an outwardly projecting bracket 198 that extends out of the housing proximate the clipper 90 and holds a voider actuator 199 in a manner that allows the actuator 199 to be mounted at different defined lateral positions according to a target product size to accommodate multiple product sizes (typically between 2-10 inch diameter products, such as, for example, about 3 inch diameter products up to about 8 inch diameter products) with the voider movement adjusted to be smaller for smaller products and larger for larger products as will be discussed further below with respect to FIG. 15.

Figure 3:
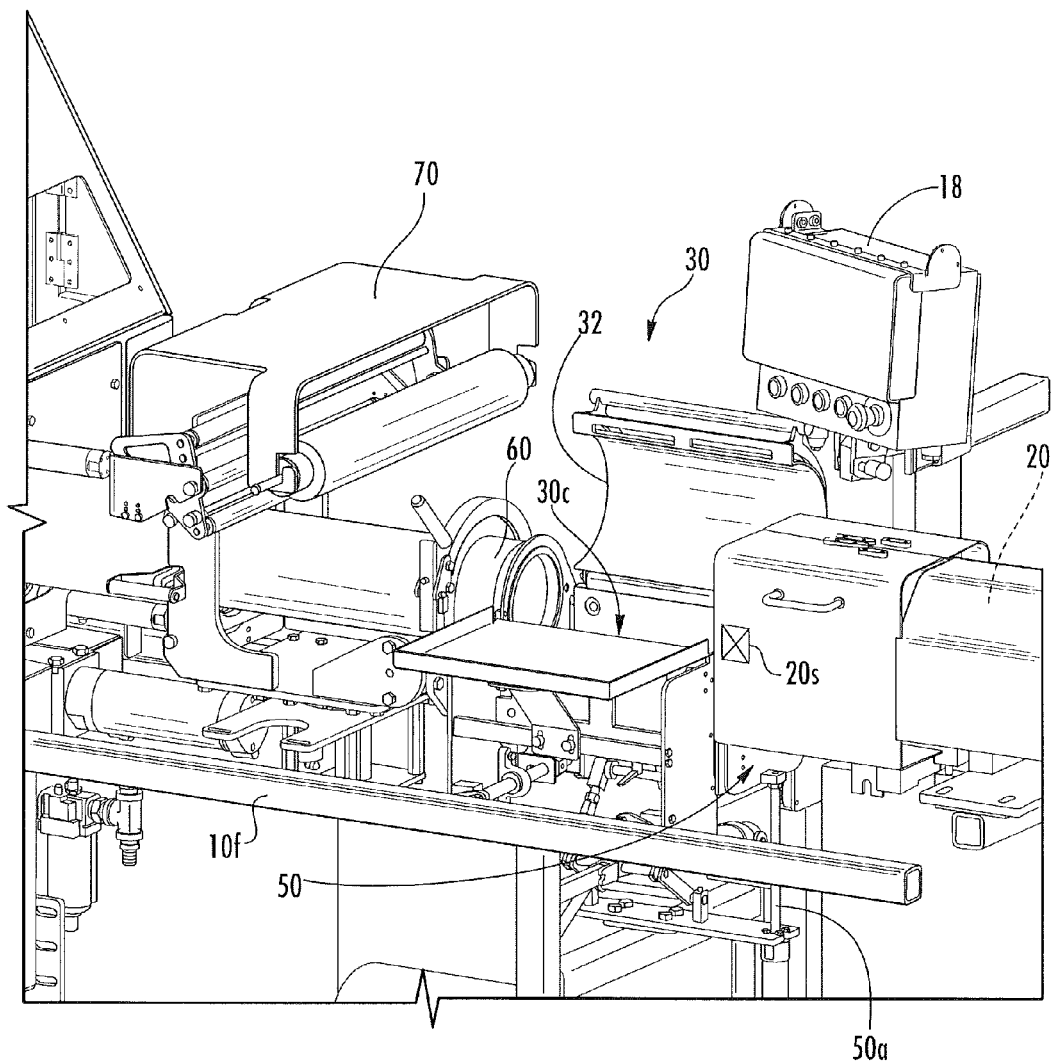
FIG. 3 is a side perspective view of a portion of the device shown in FIGS. 1 and 2 illustrating a loading chute in an open configuration according to embodiments of the present invention.

FIG. 3 illustrates the loading chute 30 in position with the ceiling 32 lifted and ready for loading product into the product holding chamber 30c. The loading chute 30 resides downstream of the product pusher mechanism 20 when the product pusher head is in the "home" or retracted position and upstream of the product chute 60. A proximity sensor 20s can be used to confirm the position of the pusher head and synchronize the locking or actuation of the blocking member 50, the release of the lock of the chute 30, and the like. The product pusher blocking member 50 can be used to trap the pusher head behind the blocking member 50 when the loading chute 30 is open. The controller 18 can electronically monitor whether the ceiling of the loading chute 30 is open and electronically retract an actuator 50a (FIG. 4A) associated with the blocking member 50 only after the ceiling is closed and the chamber 30c is in the operative position.

Figure 4A:
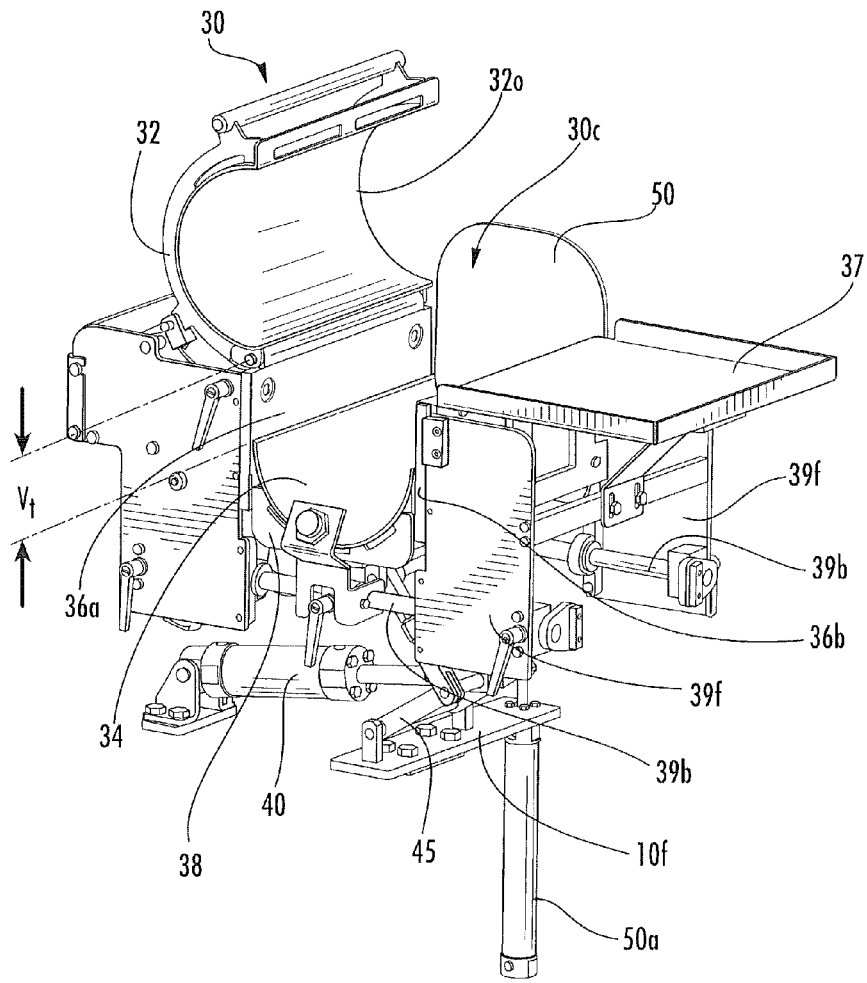
FIG. 4A is an end perspective view of a loading chute assembly with a loading chute, illustrating the ceiling in an open position and the floor in a retracted position according to embodiments of the present invention.
Figure 4B:
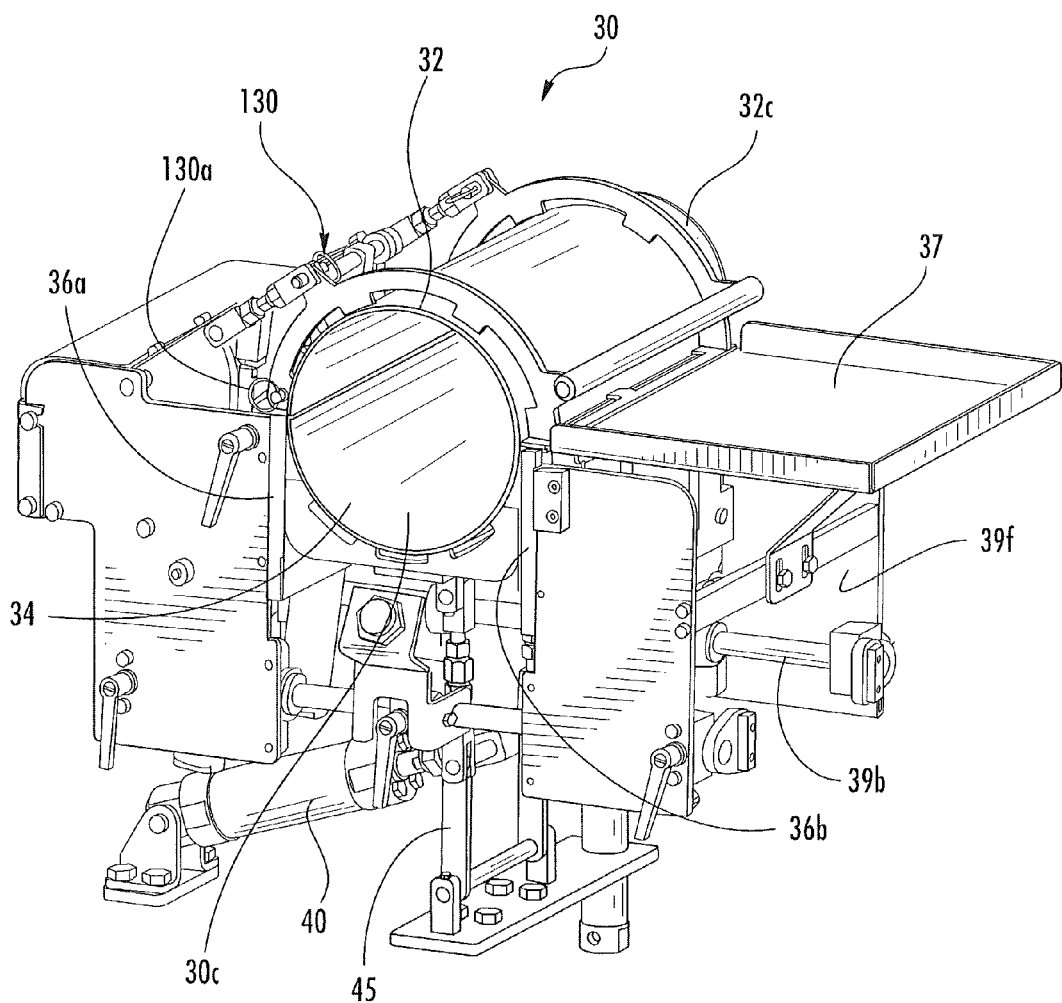
FIG. 4B is an end perspective view of the loading chute assembly shown in FIG. 4A illustrating the ceiling in a closed position and the floor in a vertically raised position according to embodiments of the present invention.

FIGS. 4A and 4B illustrate a loading chute 30 with the ceiling 32 and a vertically movable floor 34. In this embodiment, the ceiling and floor 32, 34, respectively, can each be semi-cylindrical (with a substantially semi-circular or substantially half-circle shape when viewed from the end) and can meet to define a substantially cylindrical product chamber 30c. However, other shapes can be used. As shown, the floor 34 can translate a distance "Vt" between a loading position (FIG. 4A) and the closed operative position (FIG. 4B). The vertical travel Vt can be between 1-10 inches and is typically between about 1.5 inches to about 2.75 inches. The floor 34 may be configured to have two alternate stop positions, one at a first level, such as at about 1.5 inches and another at a lower second level, such as at about 2.75 inches. The 1.5 inch drop level may be particularly suitable for smaller size chutes, such as those in the 3-5 inch diameter range. The larger drop may be particularly suitable for the larger chute sizes, such as, for example, the 6-8 inch range. The loading chute 30 with the vertically reciprocating floor and/or size adjustable chamber for loading can be used with the system shown or may be useful for other packaging and/or clipping systems.

In the loading configuration/position shown in FIG. 4A, the floor 34 (e.g., tray) travels a distance downward to expose two upwardly extending sidewalls 36a, 36b. The sidewalls 36a, 36b can comprise DELRIN® polymer or other suitable material coating or material that can be cleaned for food production. As the floor 34 is vertically retracted, the outer wall of the floor 34 can slide against the sidewalls 36a, 36b. The sidewalls 36a, 36b and/or outer surface of the floor 34 may comprise a lubricous coating or material. The pair of spaced apart upwardly extending sidewalls 36a, 36b reside on opposing sides of the product chamber 30c under the ceiling 32 and define a portion of the product chamber 30c when the floor 34 is in the loading position (FIG. 4A). The sidewalls 36a, 36b and ceiling 32 may be vertically stationary so as to remain in a fixed vertical position when mounted, in position, on the frame.

As shown in FIGS. 4A and 4B, the ceiling 32 can be pivotably attached to one upwardly extending sidewall 36a. In other embodiments, the ceiling 32 can include a window that slides or pivots open (not shown) or other configuration that allows a user to provide an opening in the loading chute 30 for loading target product (such as, by way of example, whole muscle).

In the operative position/configuration shown in FIG. 4B, with the ceiling closed 32c, the loading chute 30 can define a substantially cylindrical product chamber 30c with an axially extending through cavity/channel so that the product pusher 30 can push the product through the chamber 30c and out into the product chute 60.

The system 10 can be configured to run different diameter size products, typically between about 2-9 inches, such as, for example, about 3 inch diameter products up to about 8 or 8.5 inch diameter products, in about 0.5 inch or 1.0 inch increments. The product horn 60 may be provided in different corresponding sizes to match the sizes of the loading chutes 30 (e.g., the diameter when in the cylindrical closed configuration). The netting chute 65 may also be provided in an assortment of suitable sizes to accommodate the different product sizes desired. The controller 18 can have a programmatically selectable menu of run modes that are recipe-specific and can include product size as one input parameter to select braking and clipping parameters for automated control, and the like. Accordingly, the loading chute 30 can be provided in a range of different sizes with the corresponding pairs of ceiling and floor components 32, 34, respectively, configured to provide the desired product chamber diameter associated with the desired product size (e.g., about a 3 inch diameter chamber of about a 3 inch diameter product).

The frame and sidewalls 36a, 36b, can be laterally adjustable to accept the different size ceiling and frames. For example, as shown in FIG. 4A, the sidewalls 36a, 36b are attached to respective support frames 39f at front and back (longitudinally spaced apart) locations. As shown, two spaced apart cross-bars 39b (one in front and one in back) are attached to the frames 39f (the front bar 39b attached to the two front frames 39f, the back bar attached to the two rear or back frames 39f) and are configured to laterally adjust the position of the sidewalls 36a, 36b relative to each other. Thus, the size of the space therebetween is able to snugly hold different size floor/ceiling pairs so that the floor can abut the sidewalls 36a, 36b.

Each ceiling 32 associated with the different size diameter chambers (as measured when closed in a cylindrical configuration) can pivotably attach to an upper portion of one of the sidewalls 36a. The respective pairs of ceiling and floors (e.g., FIGS. 5A, 6A) can be provided in an assortment of product chamber diameters, including at least a plurality of the following: about 3 inches, about 3.5 inches, about 4.0 inches, about 4.5 inches, about 5.0 inches, about 5.5 inches, about 6.0 inches, about 6.5 inches, about 7.0 inches, about 7.5 inches, about 8.0 inches, and about 8.5 inches.

In the embodiment shown in FIGS. 4A, 4B, the sidewalls 36a, 36b and ceiling 32 can be stationary. The floor 34 can reside on a cradle 38 supported by the frame 10f. The floor 34 can be in communication with an actuator 40 that directs the vertical movement. The actuator 40 can be attached to a lifting mechanism 45 that resides under the floor 34 attached to the cradle 38 to cause the floor 34 to vertically reciprocate at desired times. As shown in FIG. 4B, the floor 34 can travel up to cover the sidewalls 36a, 36b. In some embodiments, the lifting mechanism 45 can be configured to provide sufficient force to be able to compress the product held in the product chamber 30c when the ceiling 32 is closed 32c and the chamber 30c is in the operative position shown in FIG. 4B. The ceiling 32 and floor 34 of the product chute 30 may not be sealed in the operative position (FIG. 4B), but typically the outer bounds of each resides closely spaced to each other as shown.

The system 10 can include a table 37 that resides proximate the loading chute 30 to allow an operator to place objects, such as slabs of whole muscle, on the table 37 and push them off the table into the chute 30 when the ceiling 32 is open. This can be called a "breech" loading table as the operator can stand to the side of the pusher/chute to load the chute 30. Automated loaders may also be used (not shown).

Figure 5A:
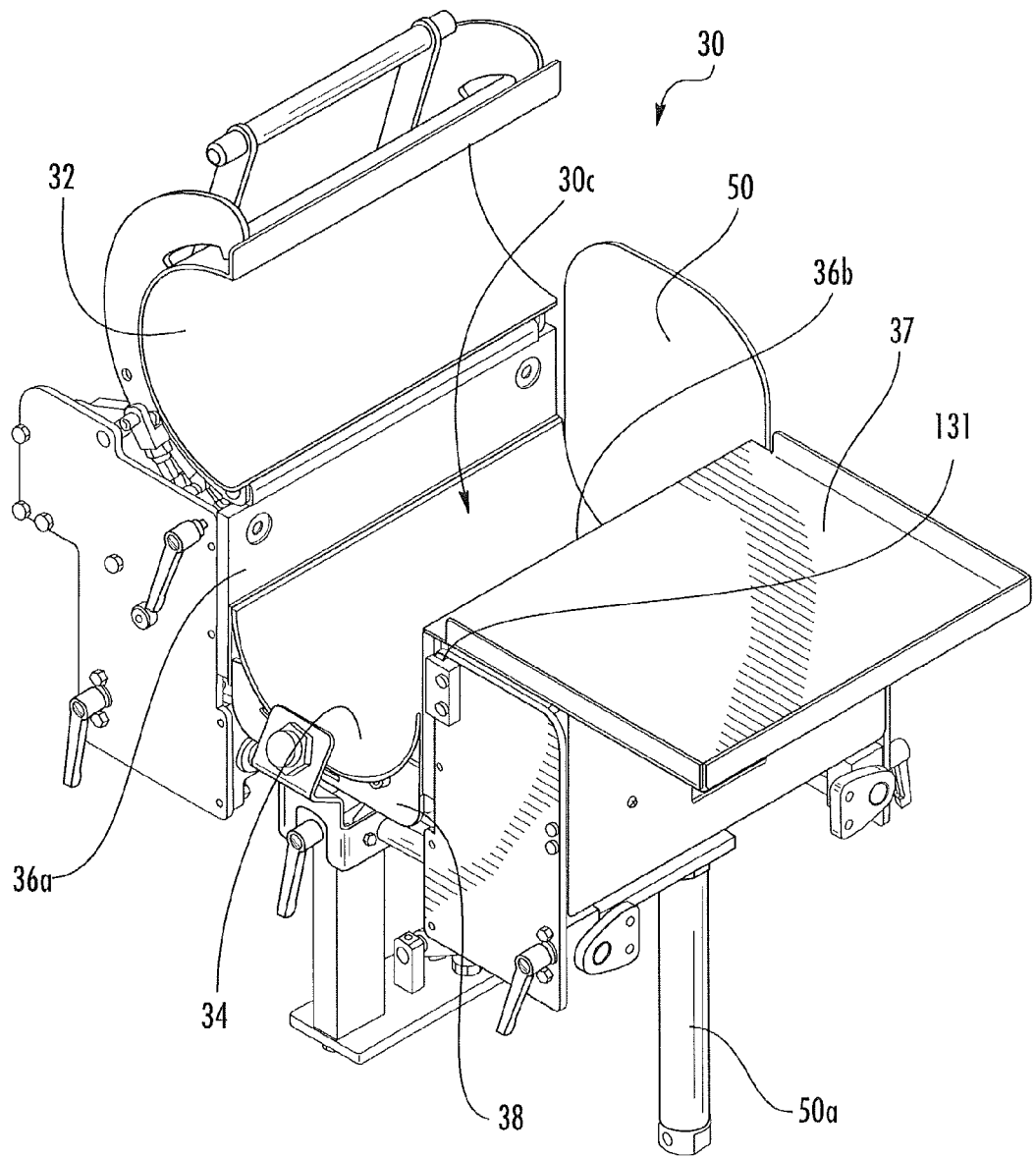
FIG. 5A is a side perspective view of a loading chute in an open position with the floor retracted for a large (diameter) size loading chute according to embodiments of the present invention.
Figure 5B:
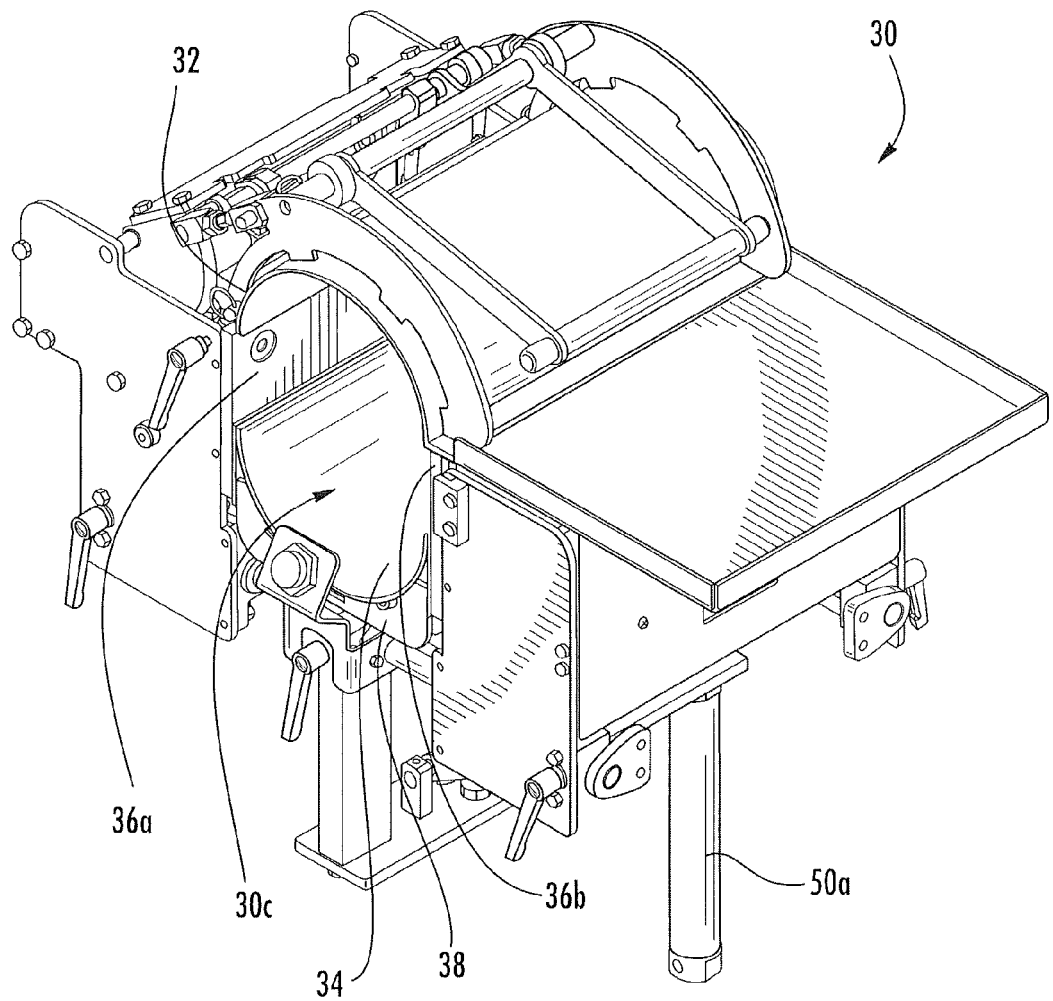
FIG. 5B is a side perspective view of the loading chute shown in FIG. 5A with the lid closed and the floor retracted according to embodiments of the present invention.
Figure 5C:
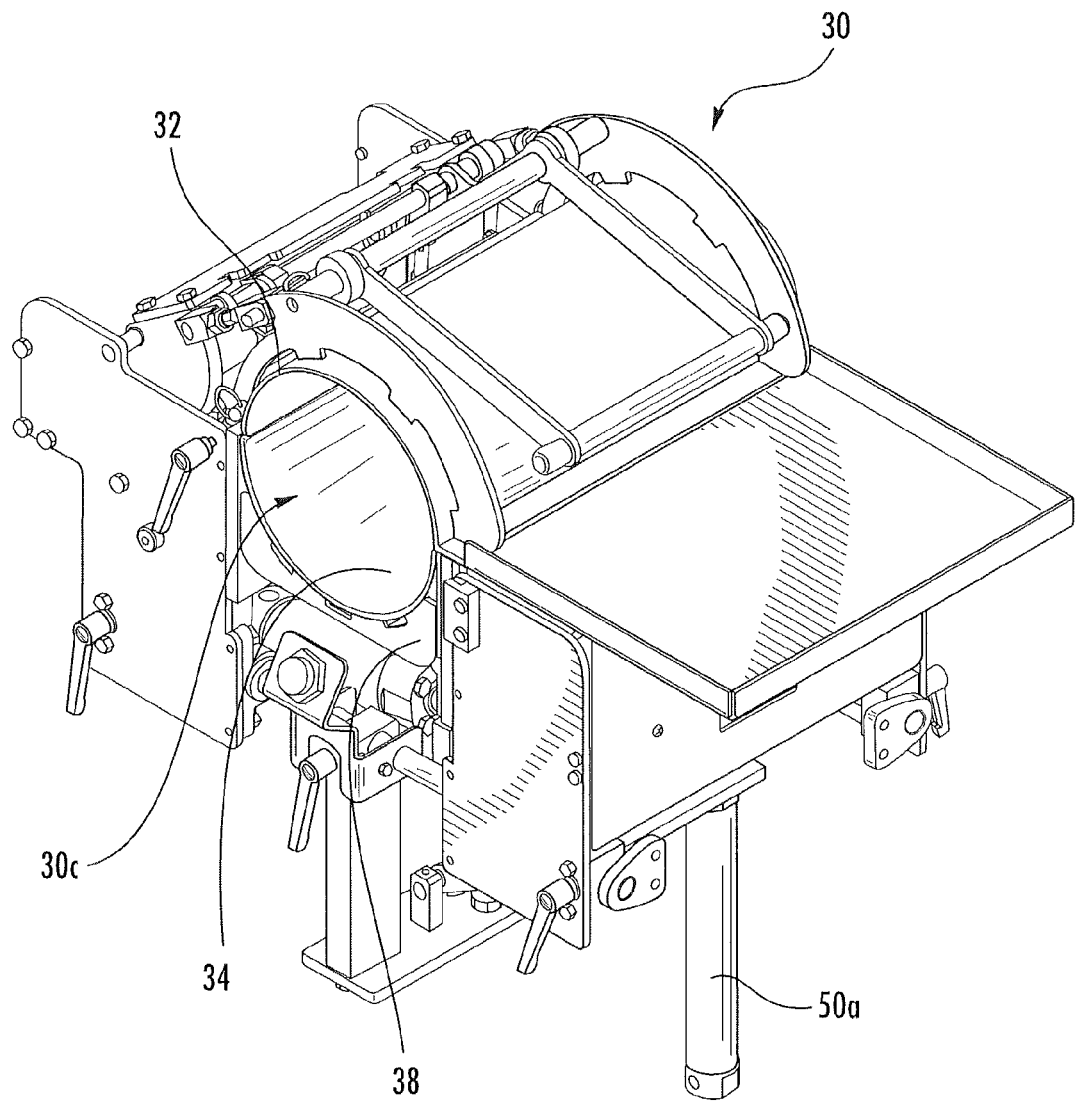
FIG. 5C is a side perspective view of the loading chute shown in FIGS. 5A and 5B but showing the floor extended to close against the lid to form the chute chamber according to embodiments of the present invention.
Figure 6A:
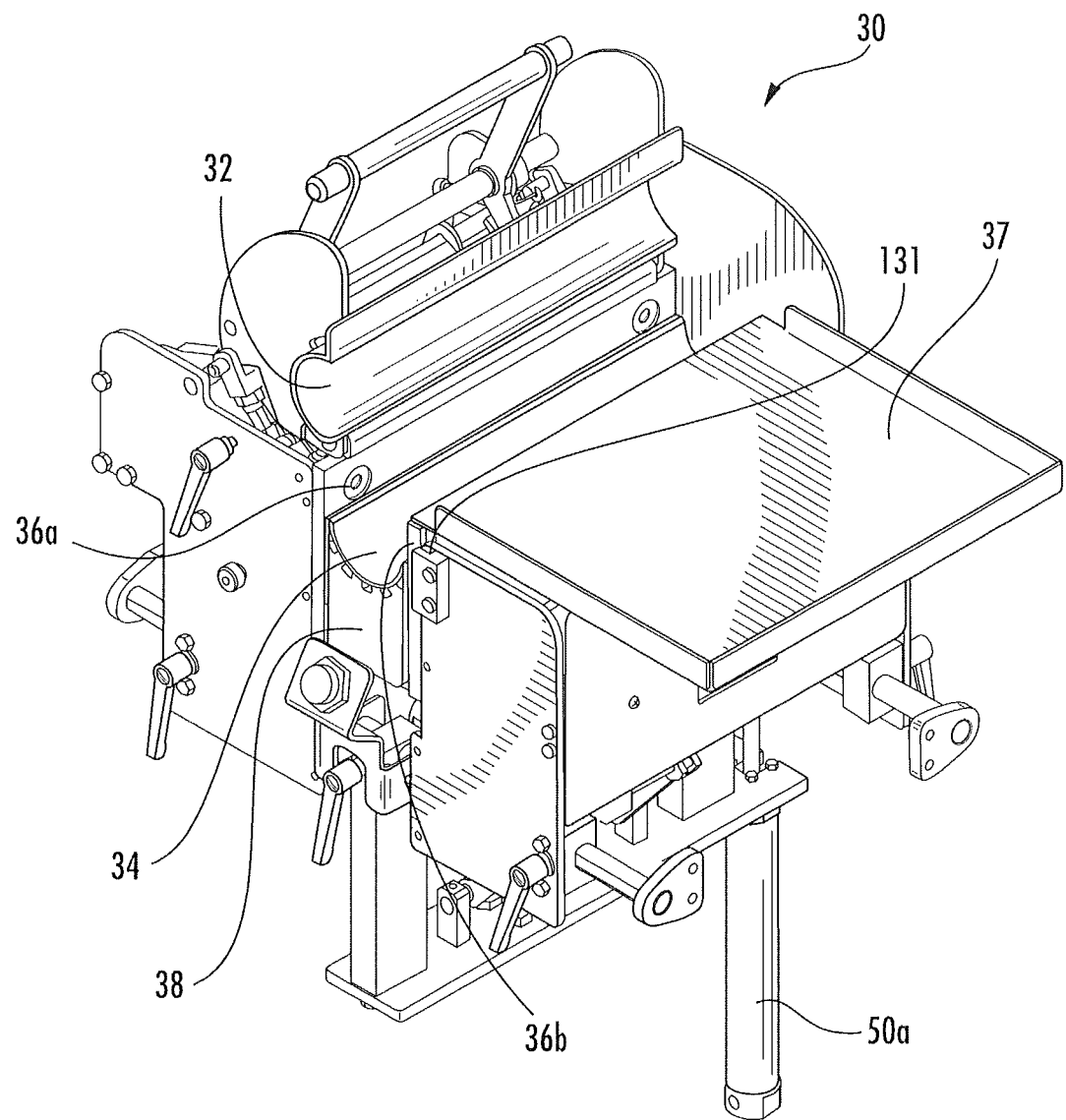
FIG. 6A is a side perspective view of a loading horn in an open position with the floor retracted for a small (diameter) size loading chute according to embodiments of the present invention.
Figure 6B:
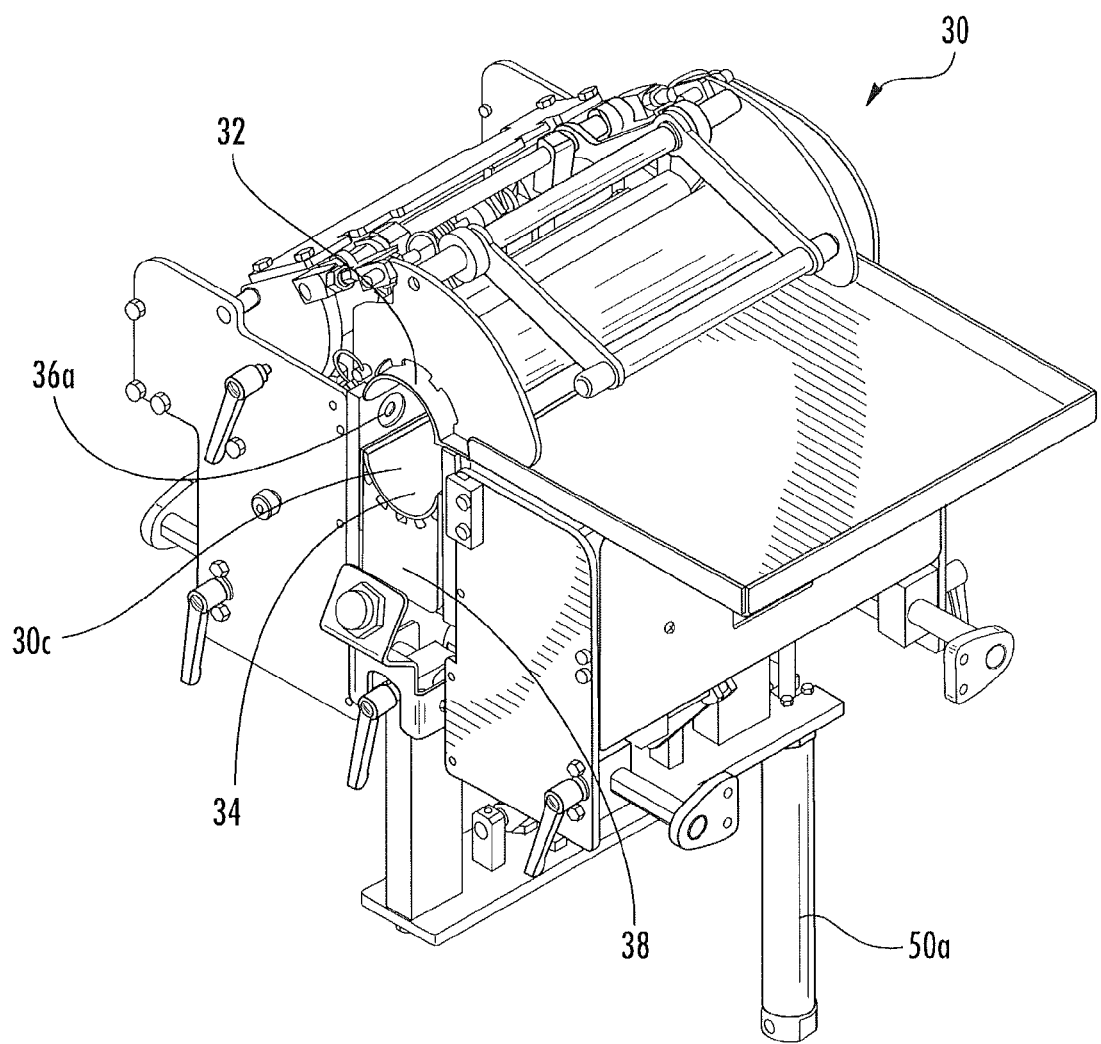
FIG. 6B is a side perspective view of the loading chute shown in FIG. 6A with the lid closed and the floor retracted according to embodiments of the present invention.
Figure 6C:
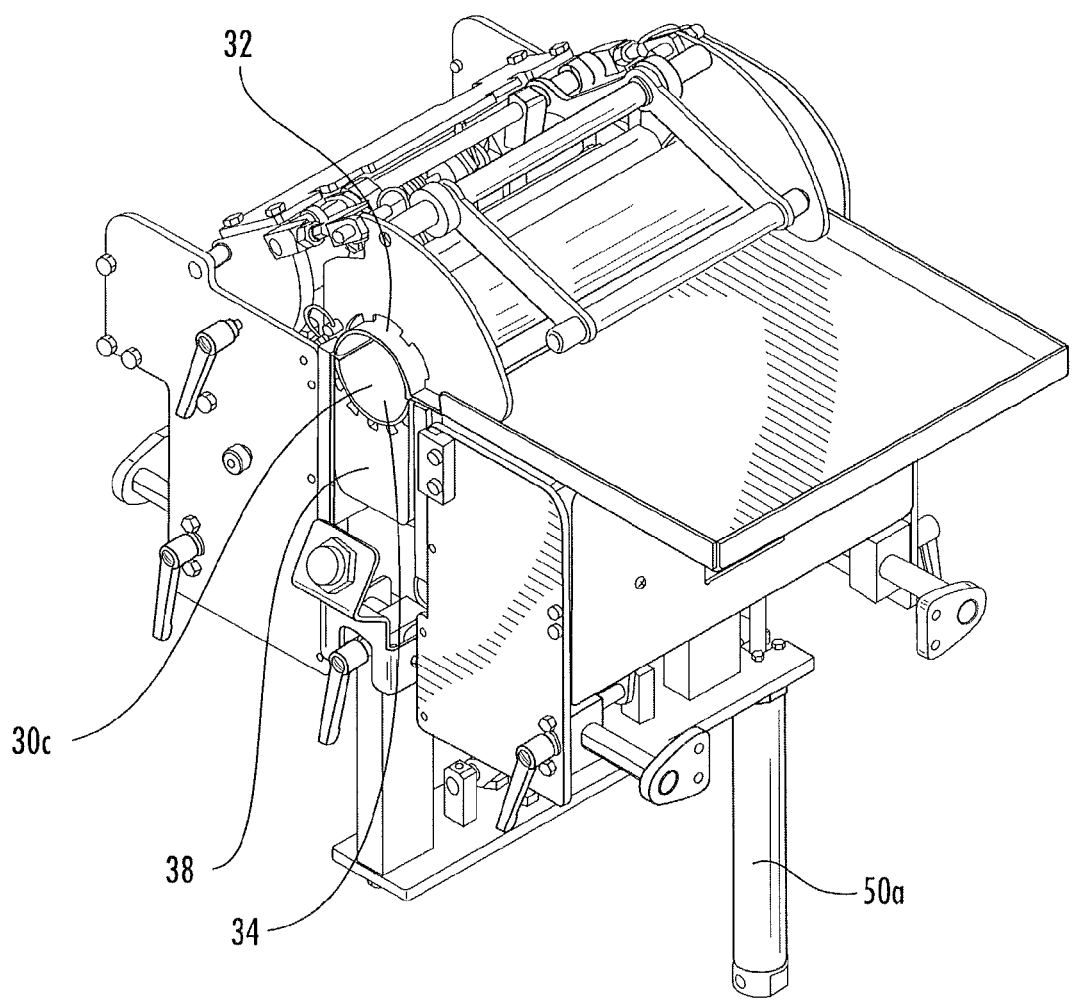
FIG. 6C is a side perspective view of the loading chute shown in FIGS. 6A and 6B but showing the floor extended according to embodiments of the present invention.

FIGS. 5A-5C illustrate the three different configurations the loading chute may have during a loading and packaging cycle. These figures illustrate a large size loading chute 30 (e.g., about an 8 diameter inch size). FIGS. 6A-6C illustrate the same three configurations for a small size loading chute (e.g., about a 3 inch diameter size). The size of the cradle 38 can vary to match the floor 34, but each cradle 38 can be configured specific for a particular size floor 34 to interchangeably mount to the same frame configuration between the sidewalls 36a, 36b and operate with the same lifting mechanism 40, 45.

Figure 7A:
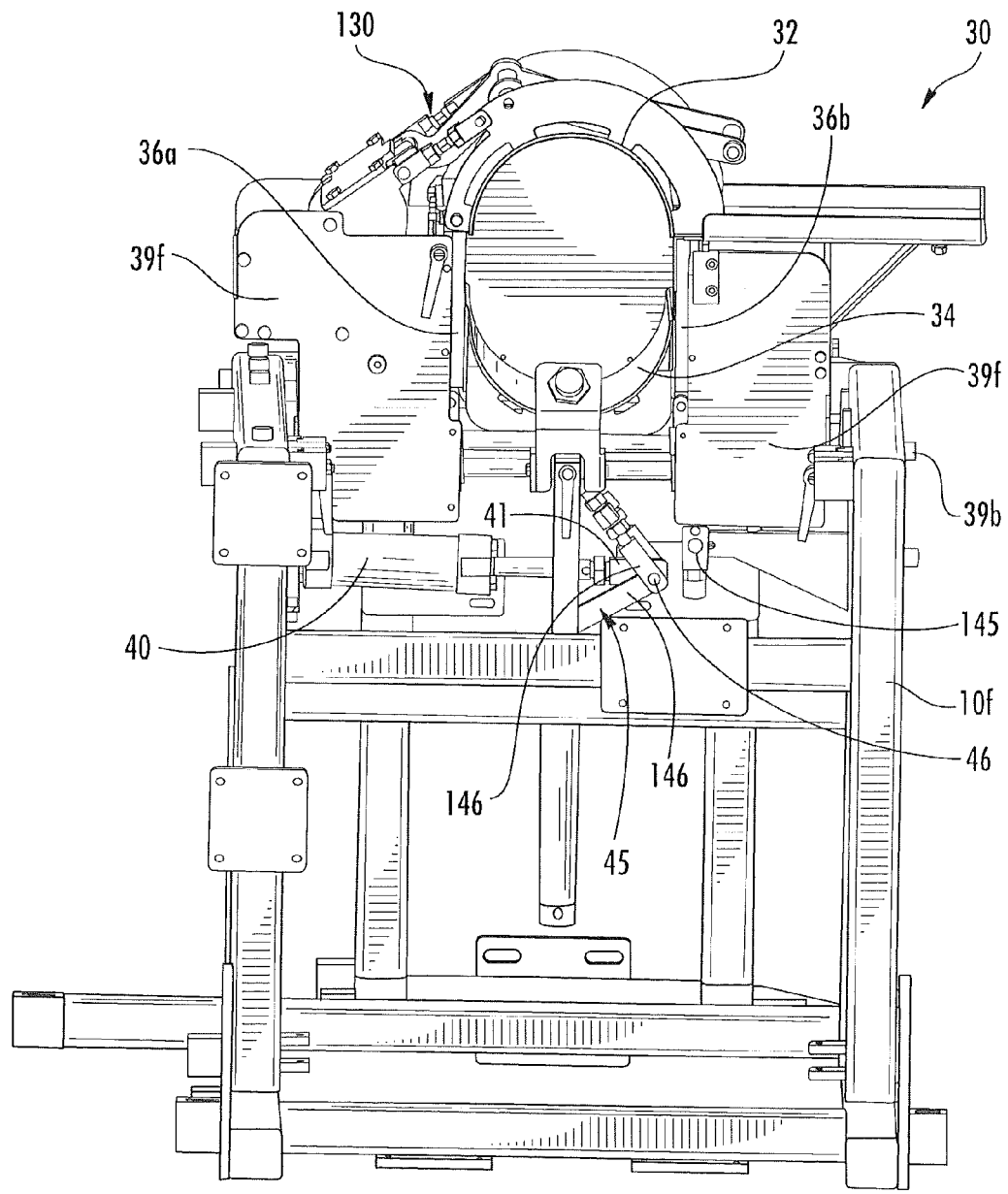
FIG. 7A is an end view of the loading chute shown in FIG. 5A illustrating the actuator and the lift mechanism according to embodiments of the present invention.
Figure 7B:
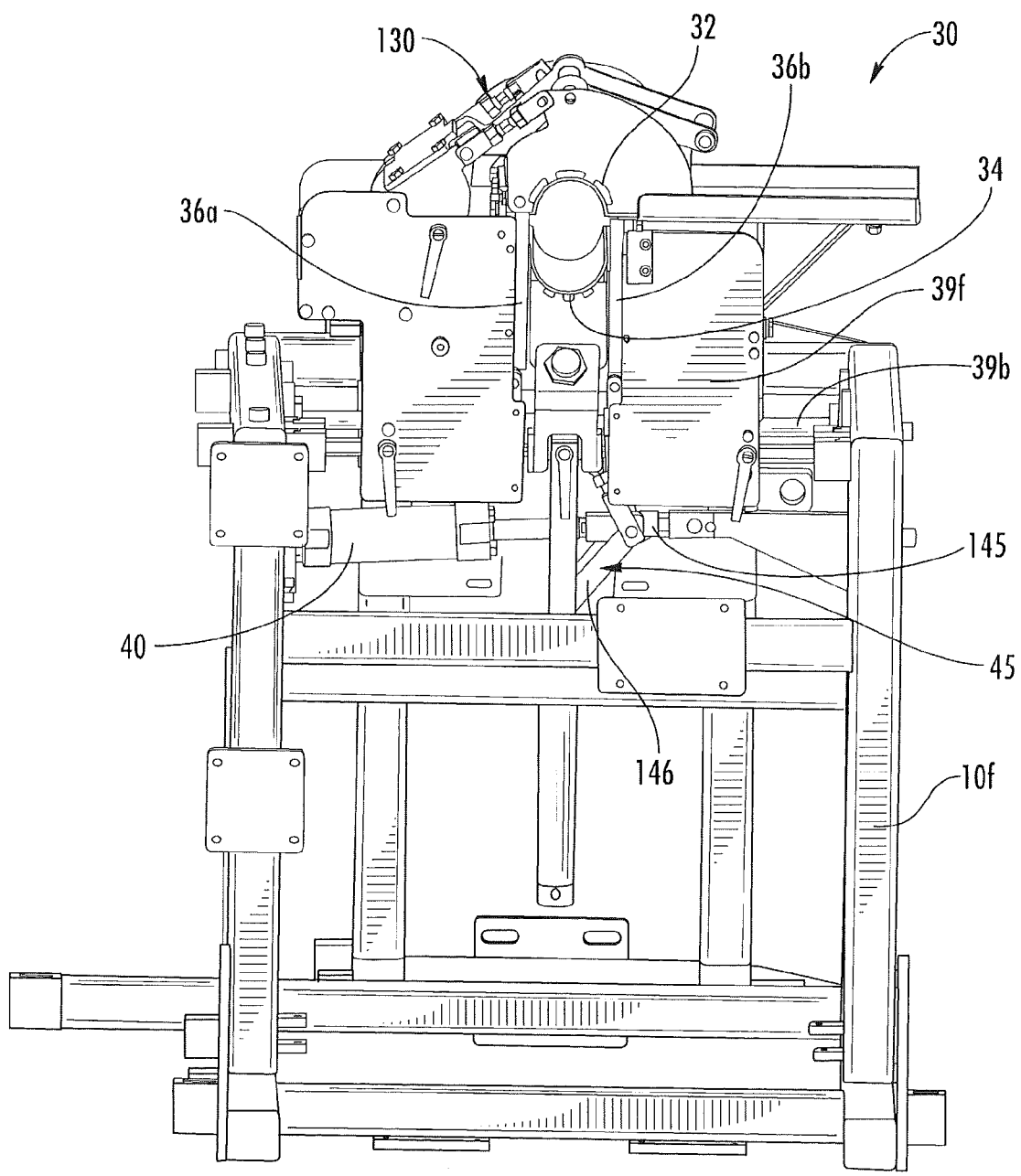
FIG. 7B is an end view of the loading chute shown in FIG. 6A illustrating the lift mechanism with a vertical drop stop/limiter according to embodiments of the present invention.

FIGS. 7A and 7B illustrate that the actuator 40 is in communication with a lifting mechanism 45 that includes a stop 145 that can flip into place (FIG. 7B) to limit the "drop" or vertical movement of the floor 34. This can be useful for smaller size chutes 30 to keep the product visible when the lid is open during loading and to limit overloading of the chute 30 with product. The "drop" can be about a 1-1.5 inch drop for a 3 inch diameter loading (e.g., breech) chute 30. The stop 145 can comprise a mechanical stop that limits the stroke of a rod associated with an actuation cylinder. When the stop 145 is in one position engaged with the lift mechanism 45 and/or rod of the actuation cylinder, the floor travels Vt to the short drop position and when in the other position (e.g., disengaged), the floor travels to the deeper or longer drop position (typically suitable for larger size chutes).

The lifting mechanism 45 can include a pair of spaced apart upper and lower links 146, each pair being pivotably attached together at a medial joint 46, and the actuator 40 can include a forward member 41 that attaches to the joints 46. The actuator 40 can extend and retract laterally. In response, the lifting mechanism 45 can bend about the joints 46 when the floor 34 is retracted and extend substantially aligned and vertical alignment when the floor 34 is fully extended (FIG. 4B).

Figure 8:
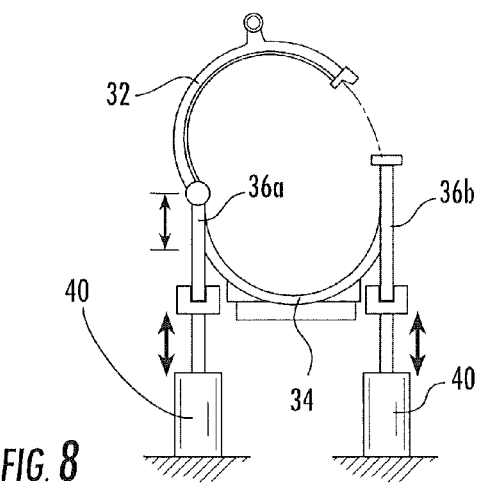
FIG. 8 is a schematic end view of an alternate embodiment of a loading chute according to other embodiments of the present invention.

FIG. 8 illustrates that the ceiling 32 can be configured to vertically reciprocate instead of (or in addition to) the floor 34. In this embodiment, the ceiling 32 is attached to one of the sidewalls 36a and both sidewalls 36a, 36b can be configured to vertically extend and retract to raise and lower the ceiling (and, typically, increase the volume and/or size of the product chamber) for loading. The sidewalls 36a, 36b can be attached to one or more (shown as two) actuators 40 that cause the reciprocating movement.

In other embodiments, both the floor 34 and ceiling 32 can be configured to vertically reciprocate between loading and operative positions such that they travel away from each other substantially in concert to the first loading position to expose substantially vertically extending spaced apart sidewalls when the ceiling is open. They also travel together when the ceiling is closed to define a substantially cylindrical product chamber.

FIG. 4B illustrates that the loading chute 30 can include a lock 130 that is electronically activated and deactivated by the controller 18 (or another circuit or processor). The lock 130 can include an actuator 130a that is operated by the controller 18 (or another circuit or processor) to control when an operator can open the ceiling 34 based on where the product pusher 20 is and on whether the floor 34 is in the loading position (FIG. 4A), before the operator is allowed to open the ceiling 32 of the loading chute 30. The loading chute 30 can also be configured to automatically open the ceiling 32 when the floor 34 is in the proper position and the product chute 20 (where used) is in the home position or is upstream of the chute 30. The loading chute 30 can include a sensor 131 that resides at a location proximate the shut lid that indicates when the lid 32 is closed (FIGS. 5A, 6A). The sensor 131 can be a proximity sensor, such as, for example, an optical sensor (infrared, photosensor, or the like), a Hall-effect sensor, a magnetic sensor, an inductive sensor, and/or any other suitable sensor. The controller 18 can monitor the status of this sensor to control when to raise and lower the floor 34.

Figure 9:
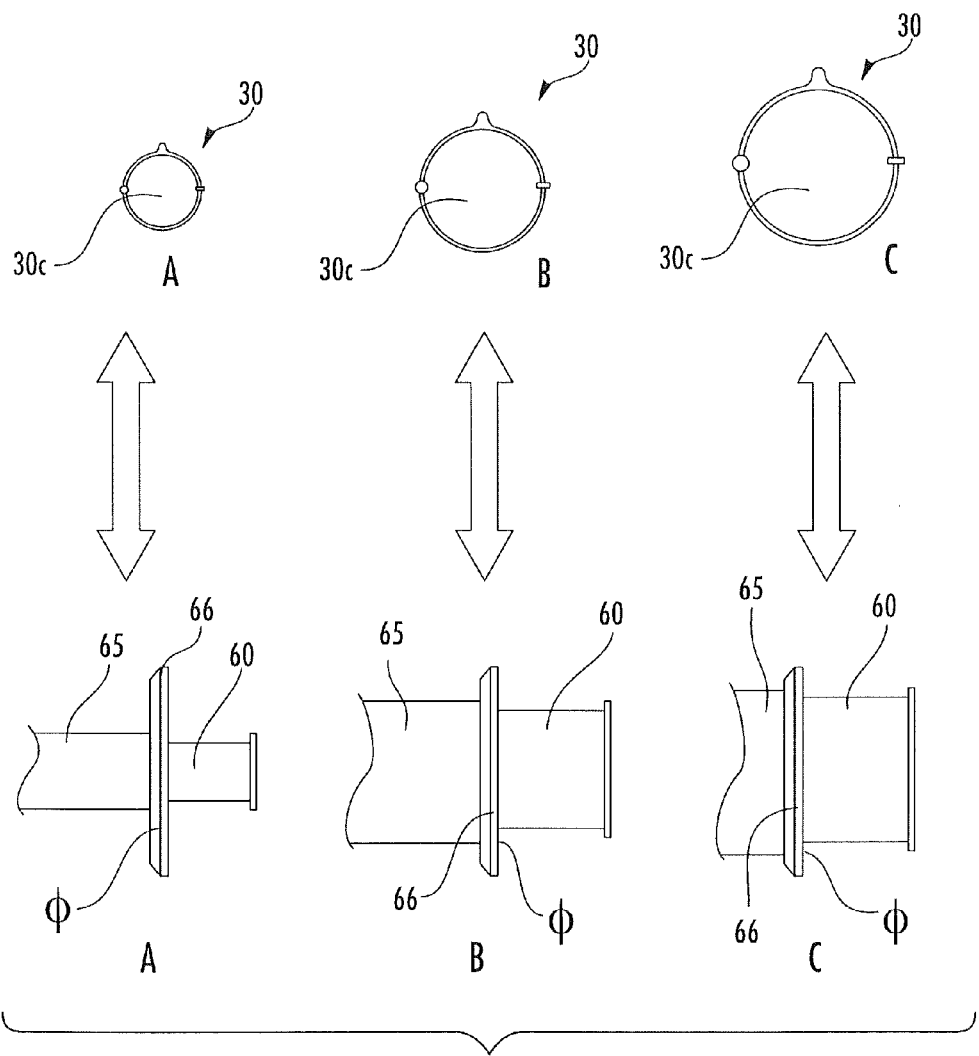
FIG. 9 is a schematic illustration of the different size loading chutes and associated product and netting chutes that can serially (selectively) operate with the system to provide increased customer options for a single apparatus according to embodiments of the present invention.

FIG. 9 illustrates that the system 10 can be configured to accept a number of different size loading chutes 30, shown as A, B and C, each having different size product diameters, typically between about 2-9 inches, and more typically between about 3 inches to about 8 inches, in defined and/or standard increments, and each typically having the same length. Each flange 66 can have the same diameter so that each associated horn 65 (even of different size diameter) can interchangeably mount to a common bracket such as that with lock 166 (FIG. 12C).

FIG. 8 illustrates that the system 10 can accommodate different sized product chutes 60 and netting chutes 65 corresponding to the target product size desired, shown again as A, B and C sizes. The chutes 60, 65 can attach to the mounting frame 10f with associated "quick release" brackets and the frame 10f and associated mounting brackets can be configured to accept different size chutes without requiring undue set-up time. The size of the product chute 60 is typically the same as the loading chute product chamber diameter 30e (when closed). The product chute 60 can be a double wall, air or fluid insulated chute. The netting chute 65 typically is sized to fit over the product chute with a closely spaced annular space. The netting chute 65 is configured to receive a discharge end portion of the product chute 60, and typically resides about at least a minor portion of the length of the product chute 60 so that the netting chute and product chute are coaxially aligned (i.e., have substantially common centerlines) with the netting chute 65 enclosing a length of the product chute 60.

FIGS. 10A and 10B illustrate the braking module (assembly) 80. As shown, the braking module 80 includes first and second pairs of longitudinally spaced apart arms 81, 82. Each arm 81, 82 holds a plurality of adjacent planar polymeric gripping members 84 (FIG. 10B shows four members $84_1$-$84_4$), with at least four gripping edges 84e that define multiple ridges rather than a continuous gripping surface which can improve the gripping contact with the netting without undue contact with the netting chute 65 during operation. The gripping members 84 can be urethane rubber having a thickness of about 1/8 inch. Each gripping member 84 can be of the same thickness or one or more may have a larger or smaller thickness. The braking arms 81, 82 comprise spaced apart planar metallic members 85 that sandwich four gripping members 84 so that at least two of the planar gripping members ($84_2$, $84_3$, FIG. 10B) contact and abut each other. The braking module can be used for derucking, braking, pulling netting desired amounts for a "slack fill" and the like. The braking module is configured so that the braking arms 81, 82 move in concert to contact the netting on the netting chute, then travel downstream a distance before moving away from the chute 65 to travel upstream then repeat the steps to pull/deruck netting. The braking arms 81, 82 can have a programmatically adjustable stroke distance, speed, frequency, and the like for different types of netting, different product requirements and the like. The settings can be user modified, but are typically selected based on a menu with product specific, e.g., recipe-defined operational parameters.

Figure 12B:
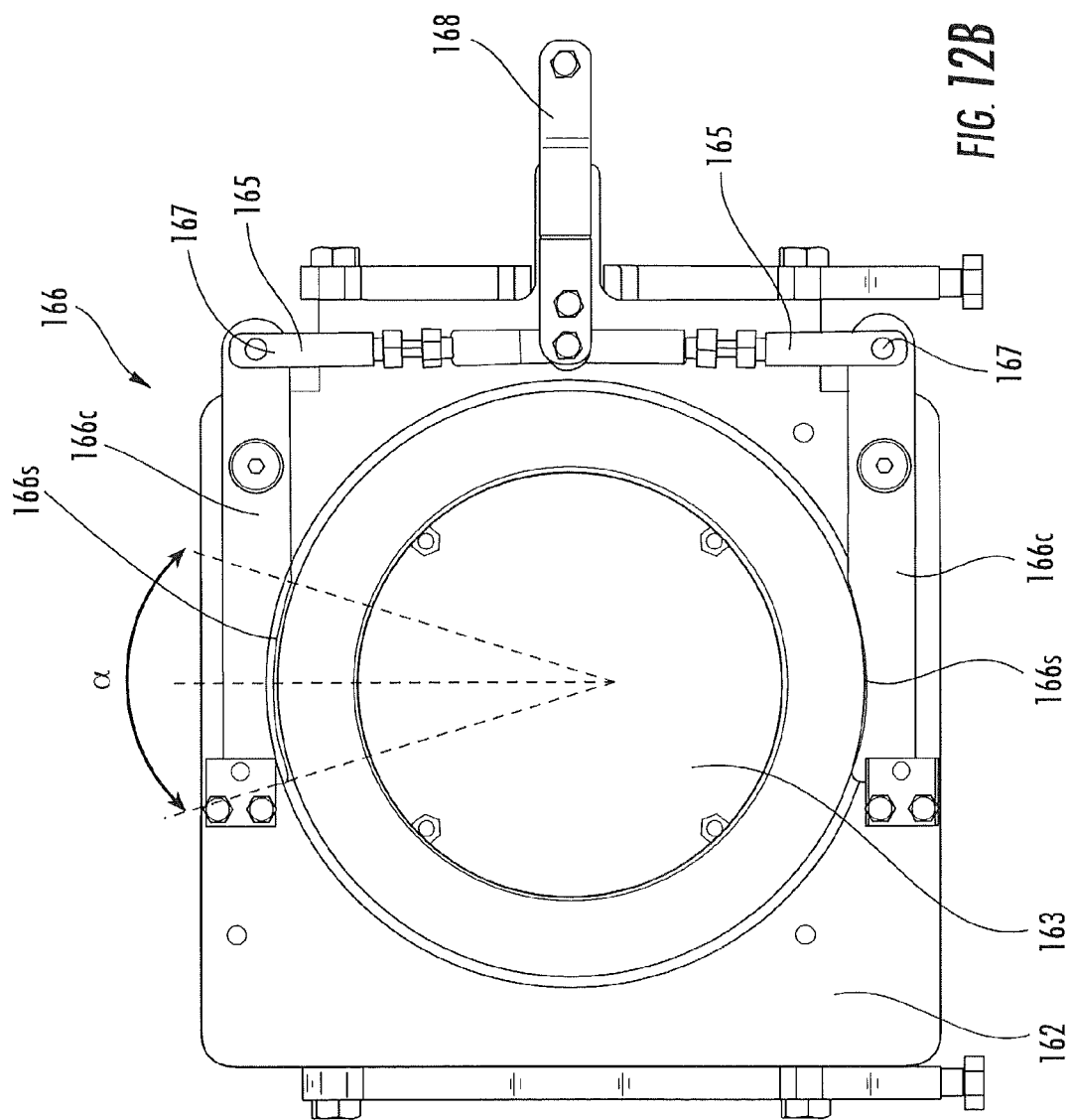
FIG. 12B is an end view of the lock shown in FIG. 12B, illustrating the lock in an engaged configuration (without a horn in position).
Figure 12C:
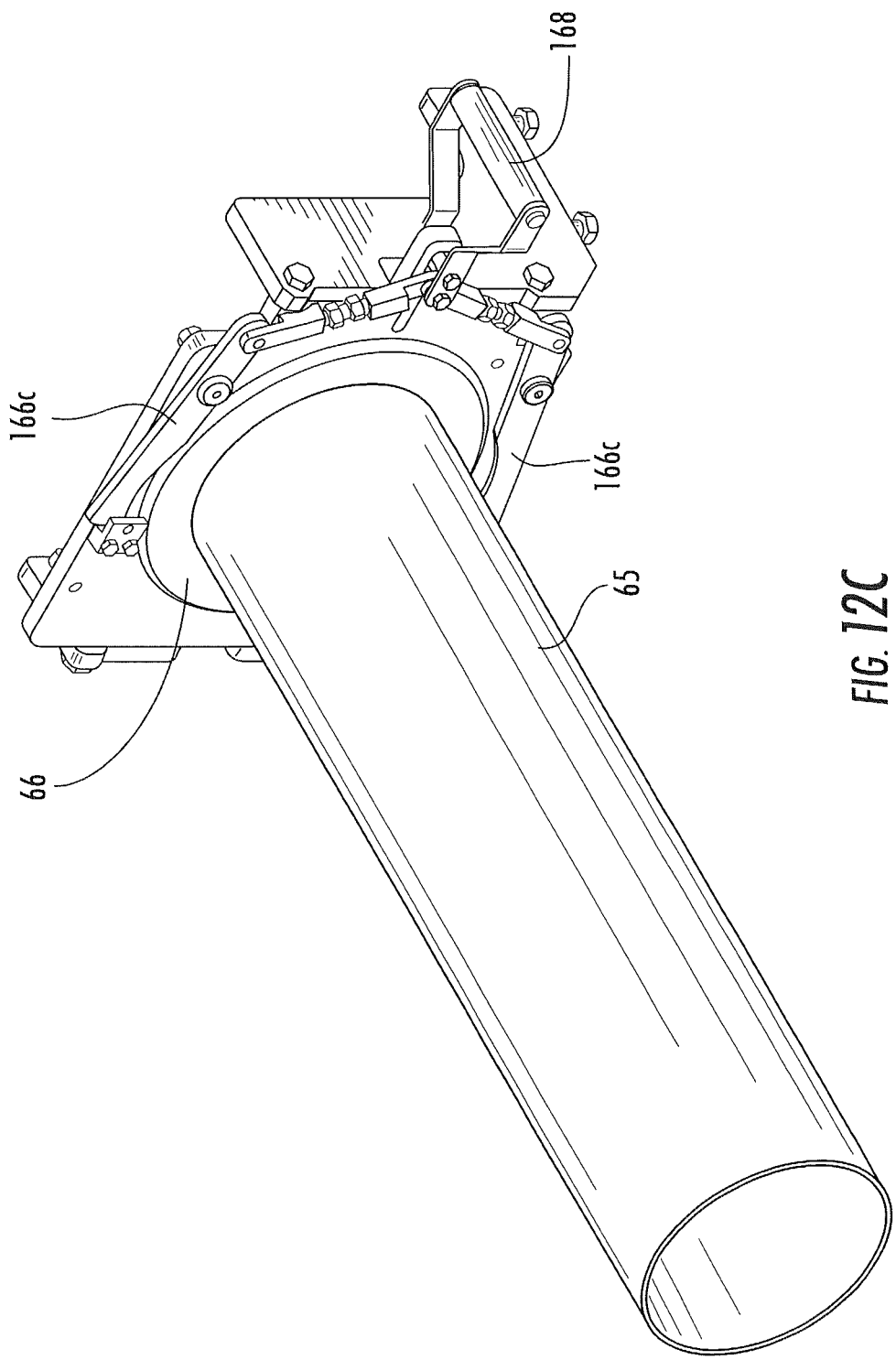
FIG. 12C is a side perspective view of the lock shown in FIG. 12A illustrating an exemplary horn aligned with the lock according to embodiments of the present invention.

FIGS. 11A, 11B and 12A-E illustrate that the netting horn 65 can include a beveled circumferentially extending flange 66 that engages with a lock 166 having upper and lower locking clamps 166c, the lower locking clamp 166c can have an arcuate curvature segment 166s that faces up, and the upper locking clamp 166c can have an arcuate curvature segment 166s that faces down, the respective curvatures corresponding to that of the shape/curvature of the corresponding portion of the beveled flange 66. As shown in FIG. 12B, the locking clamps 166c can have an arcuate segment that corresponds to an angle α that is between about 10-45 degrees of a line drawn through the center of the netting chute tube 65 that merges into the beveled flange 66.

In use, an operator can easily align the horn 65 with the lock 66 because there is no need to rotate the horn 65 to align holes with a particular (projecting) fitting. As shown in FIGS. 12A-12D, the horn 65 can relatively simply be positioned by orienting the horn 65 horizontally and placed between the upper and lower locking clamps 166c. A handle 168 can be deployed to tighten both of the locking clamps 166c against the beveled flange 66 to lock the horn in position. This allows for fast and easy loading and reloading of netting chutes with pre-rucked netting thereon. Although shown with a netting horn 65, this lock 166 can be used with tubular horns, chutes or other tubular (and particularly cylindrical) components that are desired to be released and replaced during use.

Referring to FIGS. 12A and 12B, the locking clamps 166c can each be pivotably attached via pivot joint 167 on one outer end portion of a first link 166l. The first link 166l can be attached at pivot 166p to the front plate 162 of a mounting plate 162 with a window 163. The plate 162 can be attached to the frame 10f of the system 10. The product chute 60 extends through the window 163 and through the netting chute 65 when in position. A second link 165l is attached to the first link 166l at pivot 167 on one end and at handle 168 at the other end. The second link 165l can include an extender 165e. As shown, the plate 162 can include a slot 162s and the handle 168 can include an end portion that slidably advances and retracts in the slot 162s. In use, an operator (or actuator) can slide the handle 168 forward in the slot 162s to pivot the links 166l up and down, respectively, to force the locking clamps 166c against the beveled flange 66 (FIG. 12B). To release, an operator (or actuator) can pull the handle 168 to the side (e.g., substantially orthogonal to the axially extending centerline of the chute 65), thereby pivoting the upper link upward and the lower link 166l downward, to disengage the lock 166 with the horn 65.

In some embodiments, the end of the links 166l opposing the pivot 167 can be trapped in holder 166e that allows the end to move up and down a relatively small distance in response to the pivoting of the link 166l via pivot 167.

The lock 166 can be used to secure different diameter horns 65 in position. In some embodiments, the netting horns 65 are provided in different tube diameters, all having substantially the same size flange 66, and the lock 166 can hold all the different sizes of horns (typically between about 2-9 inches, and more typically between about 3-8 inches, as shown, for example, in FIG. 9).

Figure 12E:
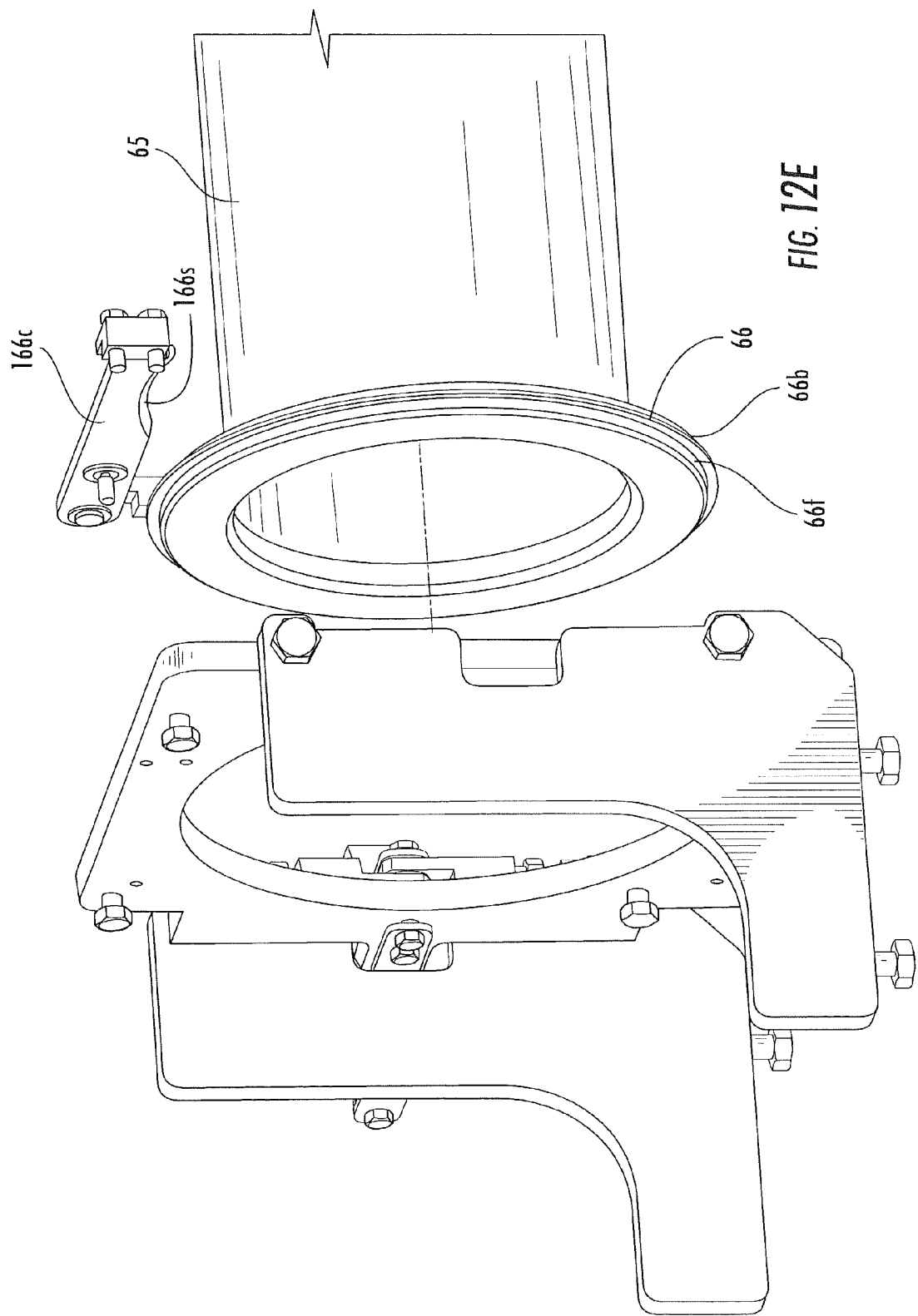
FIG. 12E is an enlarged, partially exploded side perspective view of the horn and lock shown in FIG. 12D according to embodiments of the present invention.
Figure 13:
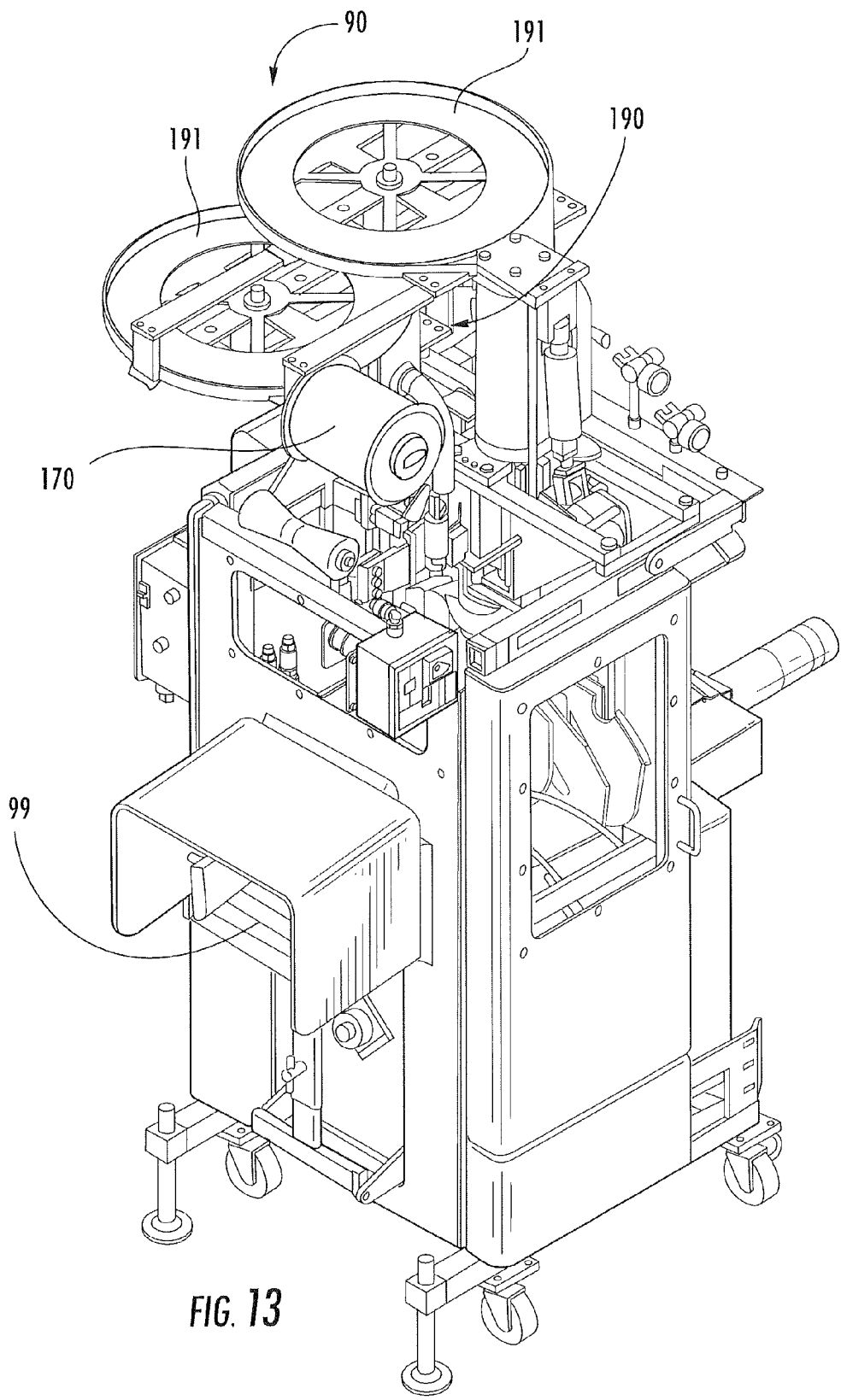
FIG. 13 is an end perspective view of a clipper module according to embodiments of the present invention.
Figure 14:
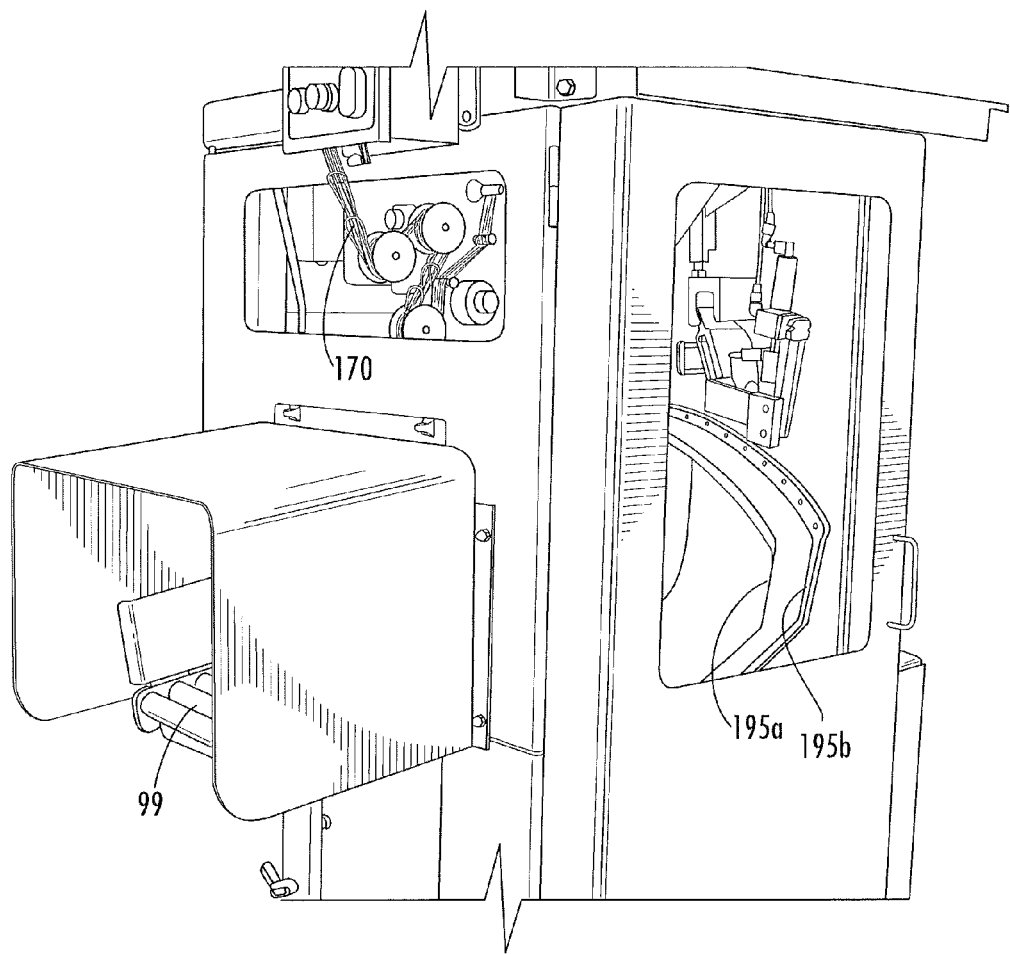
FIG. 14 is an end perspective view of the clipper module shown in FIG. 13 illustrating the vertical feed of the loopers according to some embodiments of the present invention.

FIG. 12E illustrates that the beveled flange 66 can be configured so that the end (facing the loading chute 30) has an axially extending first portion 66f with a length having a constant diameter surface that merges into the beveled edge 66b. The beveled edge 66b can taper inwardly in the downstream direction from a first larger portion that has a circumference that is larger than the flat portion 66f. The locking clamp 166c can be configured with a mating configuration to the beveled flange 66f. The horn first portion 66f can be sized to reside in the window 163.

FIGS. 13-17 show the clipper module or housing 90 with the clipper 190 and clip reels 191. One suitable clipper is the Z4 clipper from Tipper Tie, Inc. The horizontally oriented clip reels may hold Z401 or Z411 clips from Tipper Tie, Inc., of Apex, N.C. The clipper housing 90 can include a discharge table 99. The clipper module 90 can include a looper 170 that can vertically feed strands of preformed loops. As is known to those of skill in the art, loopers feed loops to a location proximate the clip window of the clipper to attach one per each clipped package to allow the package to be suspended or held by the loop after packaging.

FIGS. 15A-15D illustrate a voider assembly 195 with voiders 195a, 195b, and an actuator 199 held by an outwardly projecting bracket 198. As is well known to those of skill in the art, the voiders 195a, 195b are in communication with the clipper mechanism. The voiders help gather and "void" the casing or covering material prior to clipping. As is well known to those of skill in the art, the voiding mechanism can include a pair of spaced apart gates that can move together and apart, each with a window that converges upon the covering material that is held in tension therethrough, to force excess product out of the clipping area/volume, as is well known to those of skill in the art. The voider or voiding mechanism may help provide a tighter clipped package.

Figure 15A:
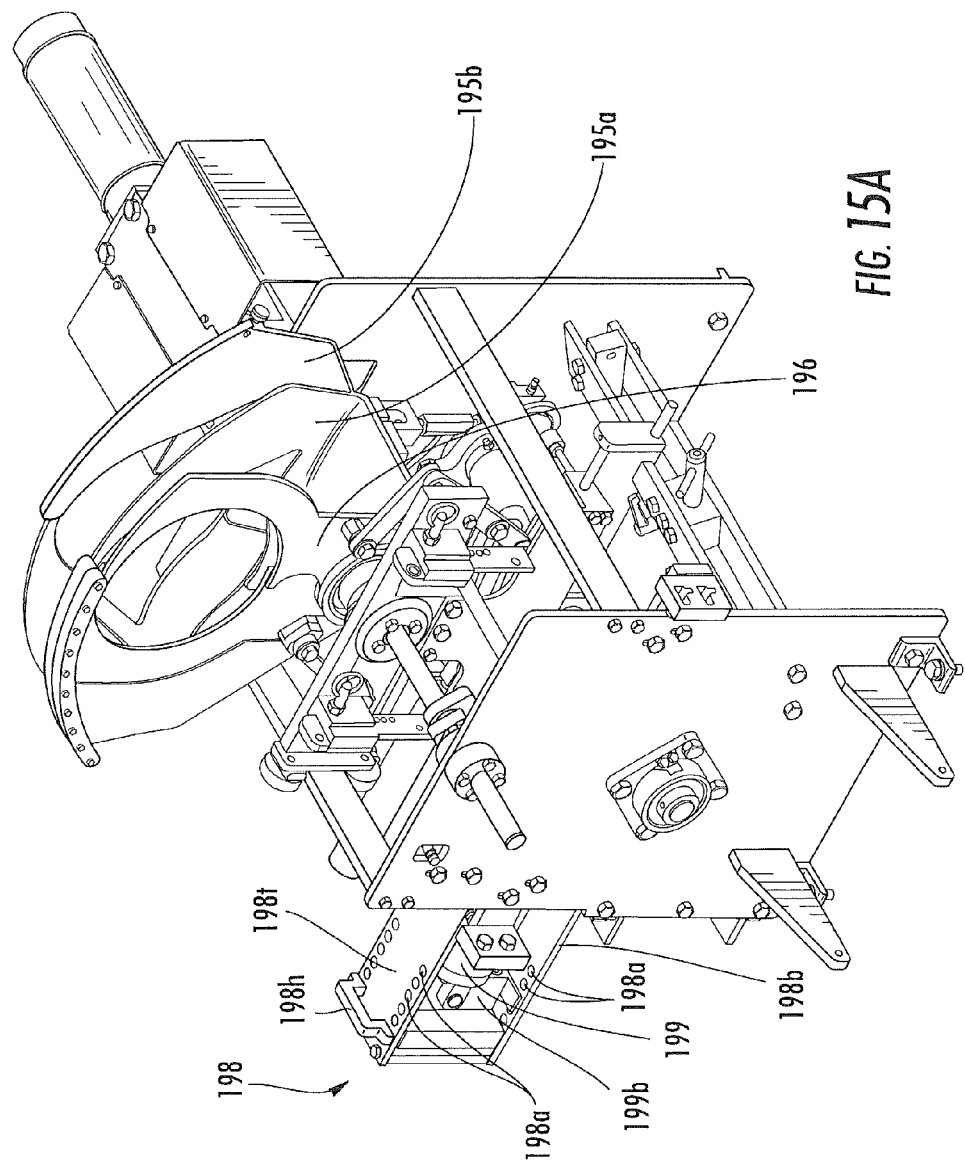
FIG. 15A is a side perspective view of a portion of the clipper module illustrating a voider assembly according to embodiments of the present invention.
Figure 15C:
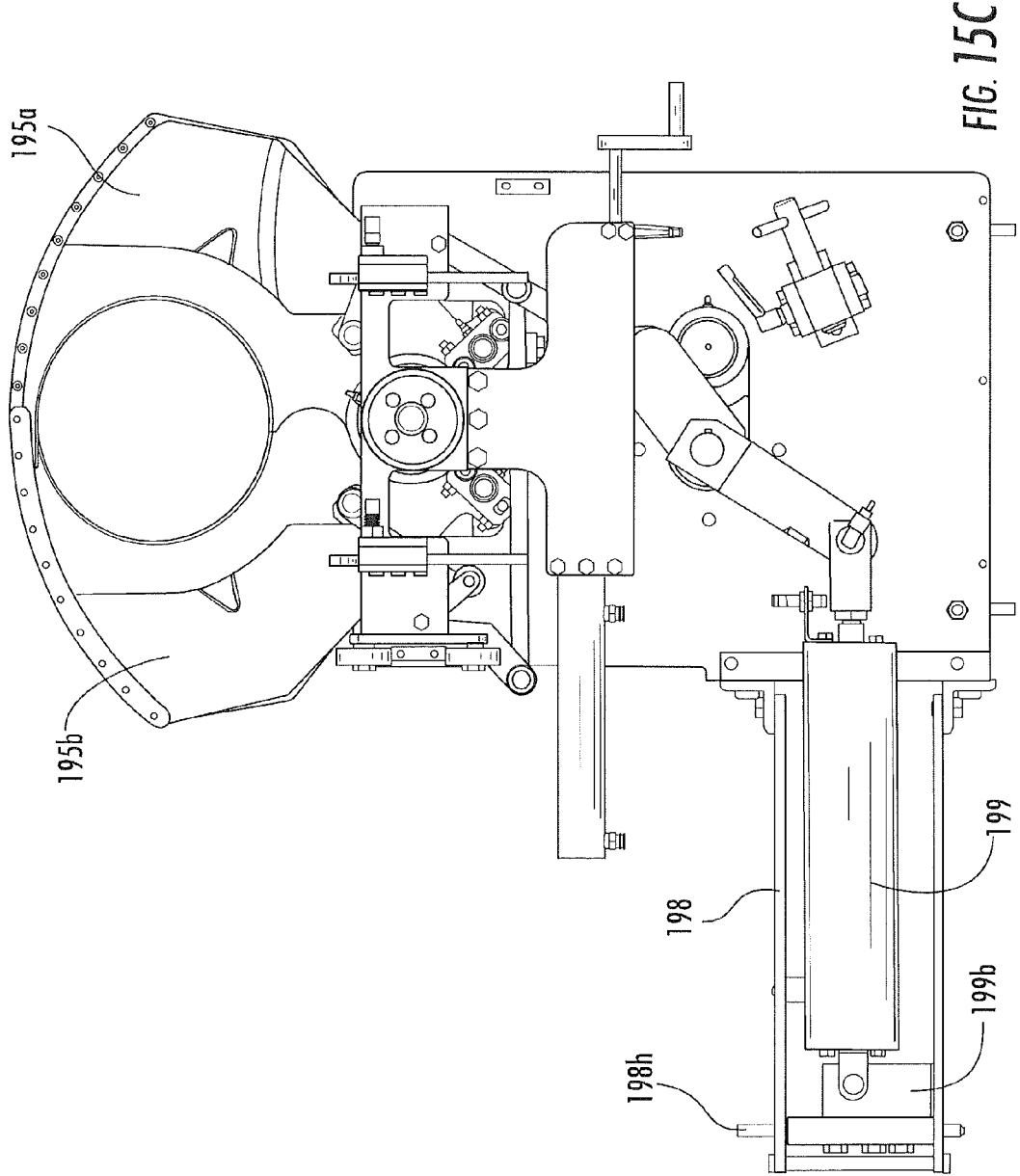
FIG. 15C is an end view of the clipper module shown in FIG. 15B illustrating the voiders open for a larger product.
Figure 15D:
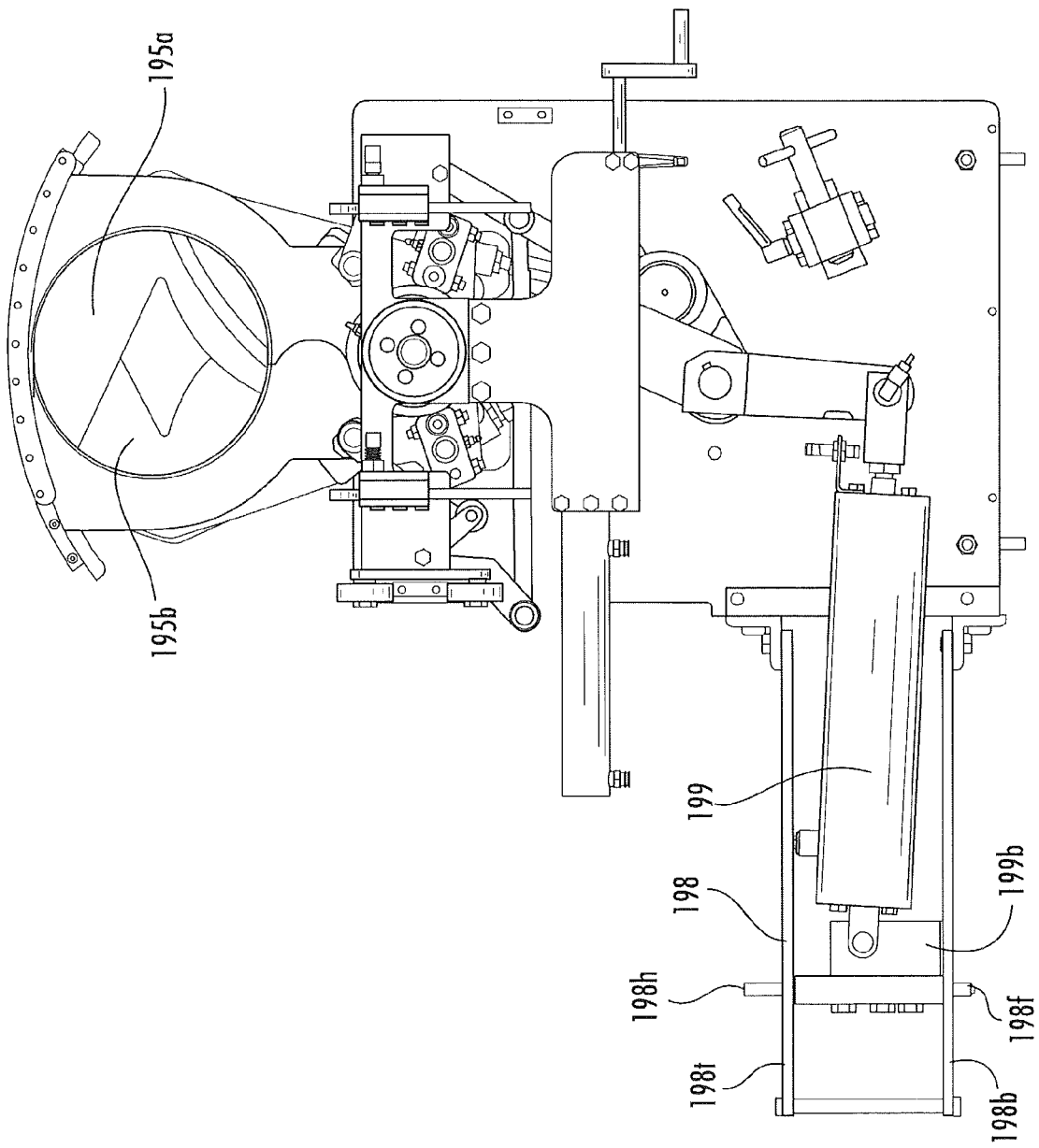
FIG. 15D is an end view of the clipper module shown in FIG. 15A illustrating the voider in an open configuration (with a smaller window) and the actuator held at a second (more inward) lateral position by the bracket for smaller products according to embodiments of the present invention.

The voider actuator 199 is in communication with and moves the voiders 195a, 195b together and retracts them apart. As shown in FIGS. 15A-15D, the voider actuator 199 has a mounting body 199b attached to an end portion thereof that is held by the bracket 199 to allow the voider actuator 199 to be moved to one of a plurality of different defined lateral positions so that the voiders 195a, 195b have different home positions according to a desired target size product. Consequently, the voider actuator 199 has a smaller stroke cycle for smaller products (FIG. 15D) and a larger stroke cycle (FIG. 15C) for larger products. The product holder(s) 196 typically always open fully, but their closed position can be adjusted to best hold the product size in production. FIG. 15B shows an exemplary position of the actuator 199 for a larger product (e.g., an 8 inch diameter product) and FIG. 15D shows the position of the actuator 199 in the bracket 198 relative to a smaller product (e.g., a 3.5 inch product).

Figure 16:
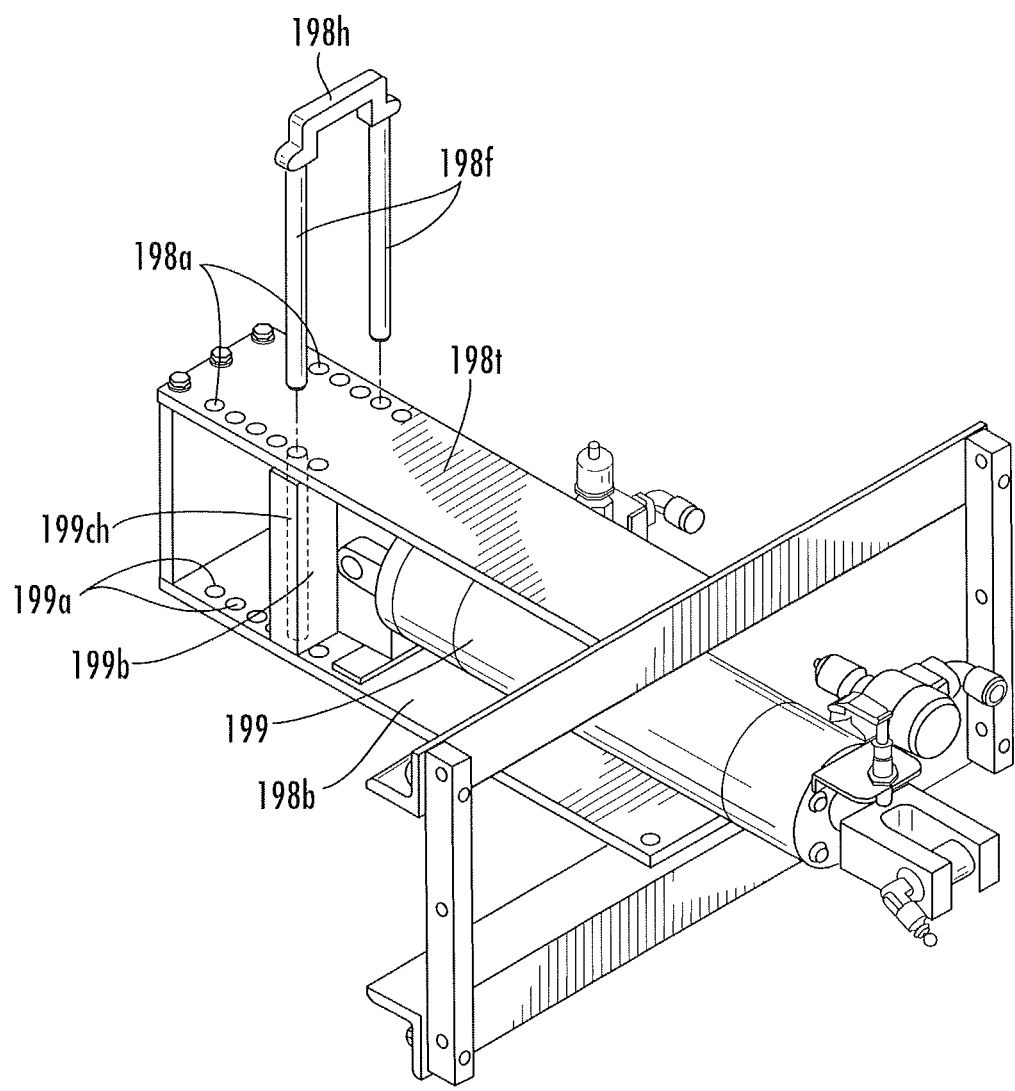
FIG. 16 is an exploded side perspective view of the bracket and actuator shown in FIGS. 15A-15D according to embodiments of the present invention.

As shown in FIG. 16, the bracket 198 has spaced apart upper and lower plates 198t, 198b, respectively, each with pairs of apertures 198a, each lateral defined position corresponding to a pair of apertures 198a aligned on the top and bottom plates. The actuator mounting body 199b has downwardly extending through-channels 199ch that align with pair of apertures 198a on the upper and bottom plates 198t, 198b. The bracket 198 comprises an upwardly extending handle 198h with downwardly projecting tines or fingers 198f that extend through the apertures 198a on the top plate 198t and into corresponding aligned channels 199ch in the mounting body 199b that allow a user to remove the handle 198h, move the mounting body 199b to a desired lateral location, then attach the handle 198h with the tines 198f through the top plate 198t, channels 199ch, and apertures in the bottom plate 198b to releasably lock the actuator 199 in position. The body 199b may have closed end channels that accept the tines from the handle with downwardly projecting tines that engage the bottom plate apertures 198a. Other mounting configurations may be used to allow for the lateral position adjustment of the actuator 199.

In operation, an operator can manually place pieces of product that may be pre-positioned on the side table 37, then in the loading chute 30. Alternatively, automated loading may also be used (not shown). The product pusher assembly 20 can linearly retract and advance a pusher head to push a product through the product chute 60 so that the product is enclosed in netting, then positioned proximate the clipper 90. The product pusher head then retracts to a resting "home" position upstream of the loading chute 30. When the product exits the product chute 60 it is encased/held in the covering material as the covering material is drawn downstream. The clipper then operates so that the covering material may be clipped, welded, fused, knotted or otherwise closed and/or sealed at leading and trailing edge portions thereof.

As described above, a sleeve of covering material (designated at 65n in FIG. 10B) can be positioned about the external surface of the netting chute 65 and configured to be drawn downstream thereof so as to automatically encase the product as the product emerges from the discharge end of the product chute. A supplemental sleeve material holder may also be used if desired instead of placing the sleeve of casing material on the netting chute (not shown). The supplemental sleeve holder can be configured to surround a downstream portion of the product chute.

In some embodiments, the chutes 60, 65 may optionally include replaceable collars/inserts at the junction of the two chutes to allow repair or wear that may occur over long use periods due to rotation and positioning of the chutes from loading and unloading configurations (not shown).

Figure 17:
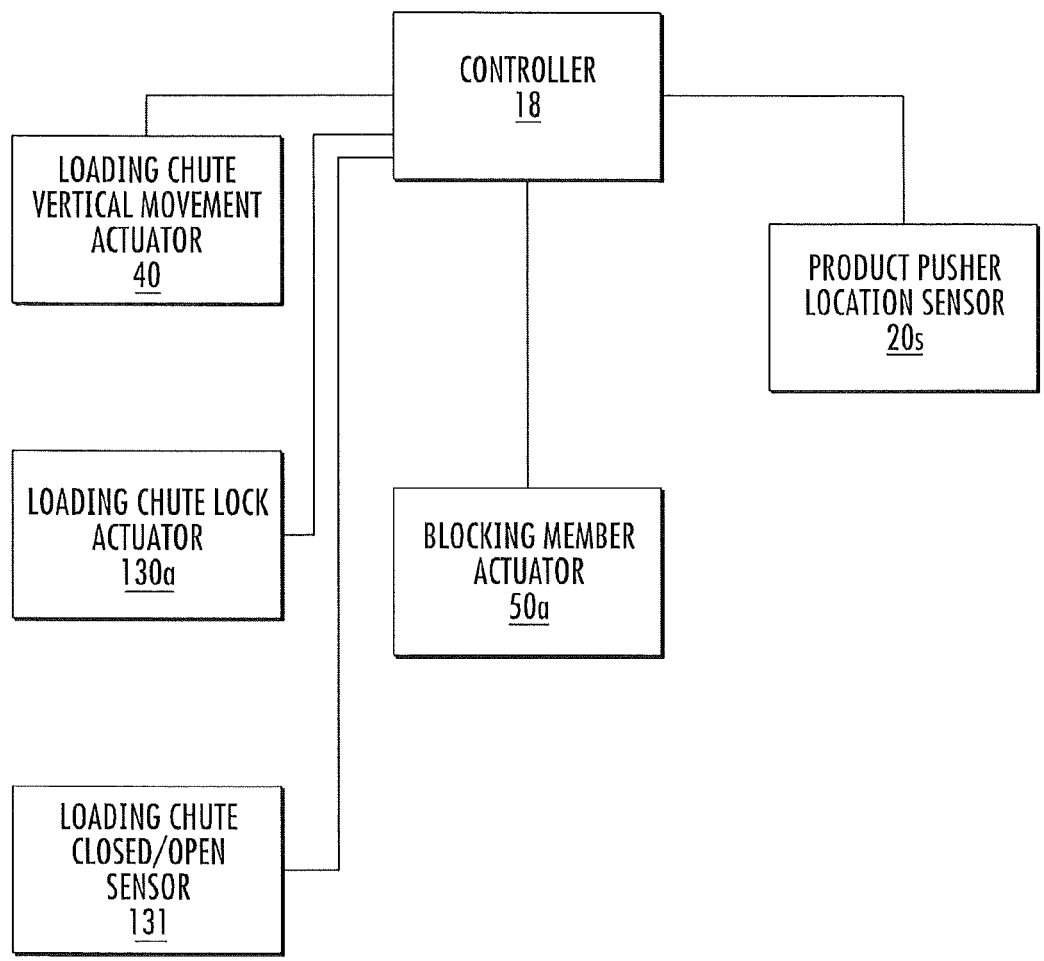
FIG. 17 is a schematic illustration of a control circuit according to embodiments of the present invention.

FIG. 17 illustrates a circuit 200 that can be used with the system 10 and/or portions thereof. As shown, the circuit 200 includes a controller 18 (which can be more than one controller and may be remotely controlled or monitored via the Internet or other local or wide area network). The controller 18 communicates with different actuators 40, 50a, 130a and sensors 131, 20s to control operation of features that can promote safe operation and/or speed.

Figure 18:
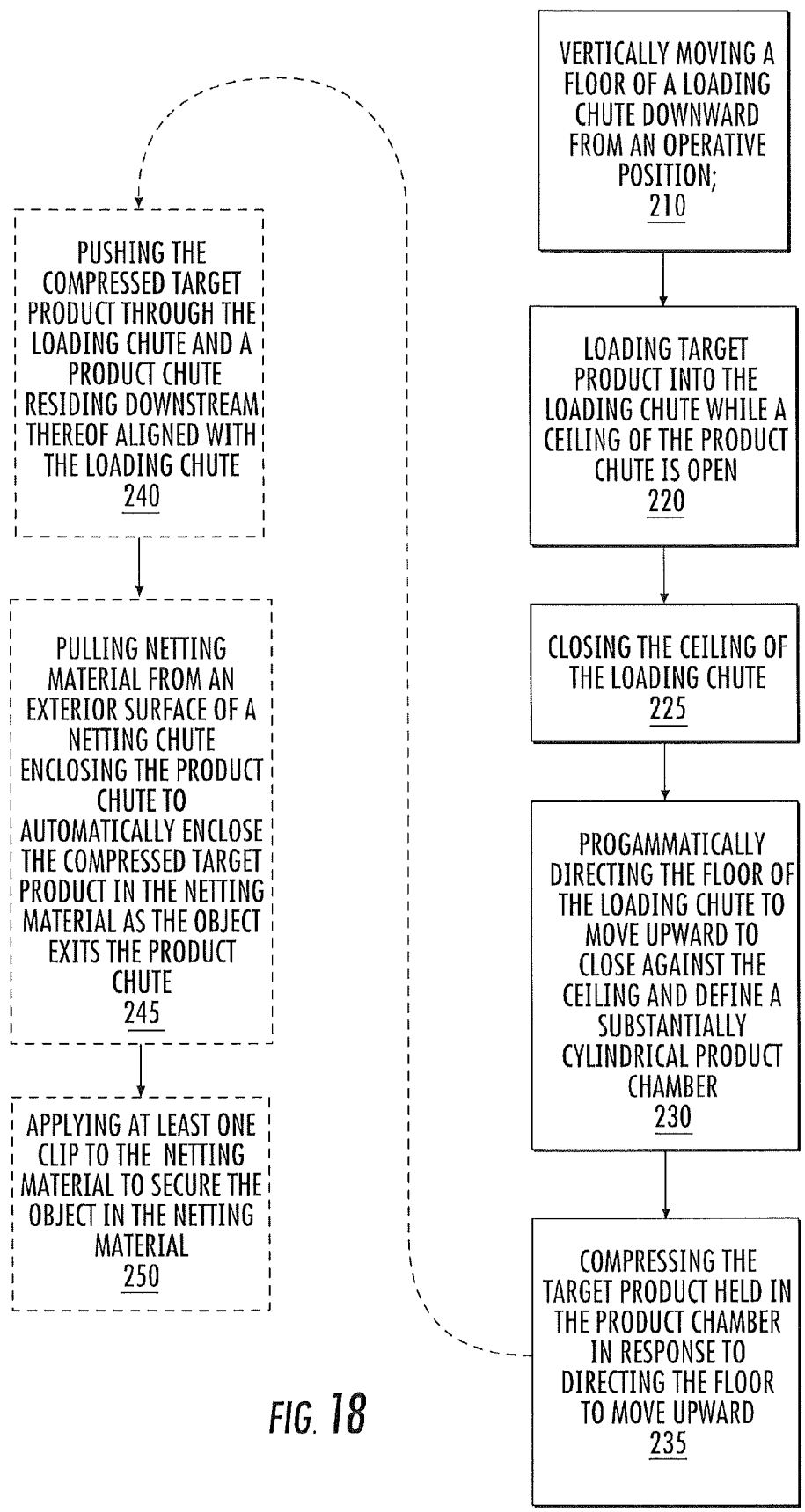
FIGS. 18-20 are flow diagrams of illustrative operations that can be used to carry out embodiments of the present invention.
Figure 19:
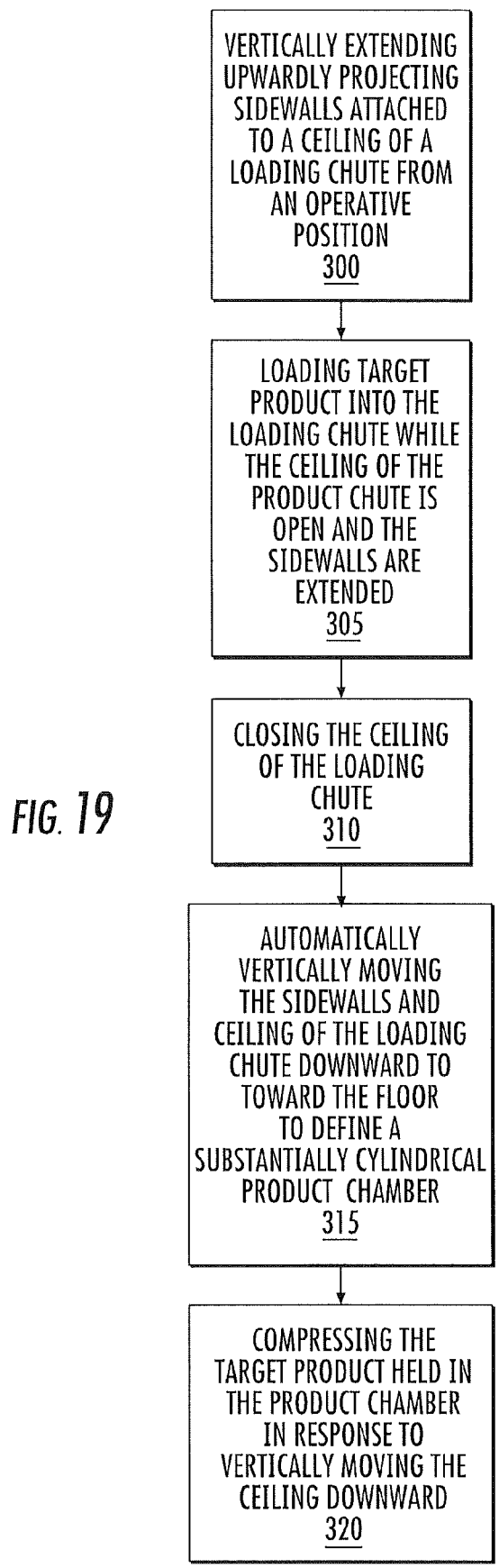
Figure 20:
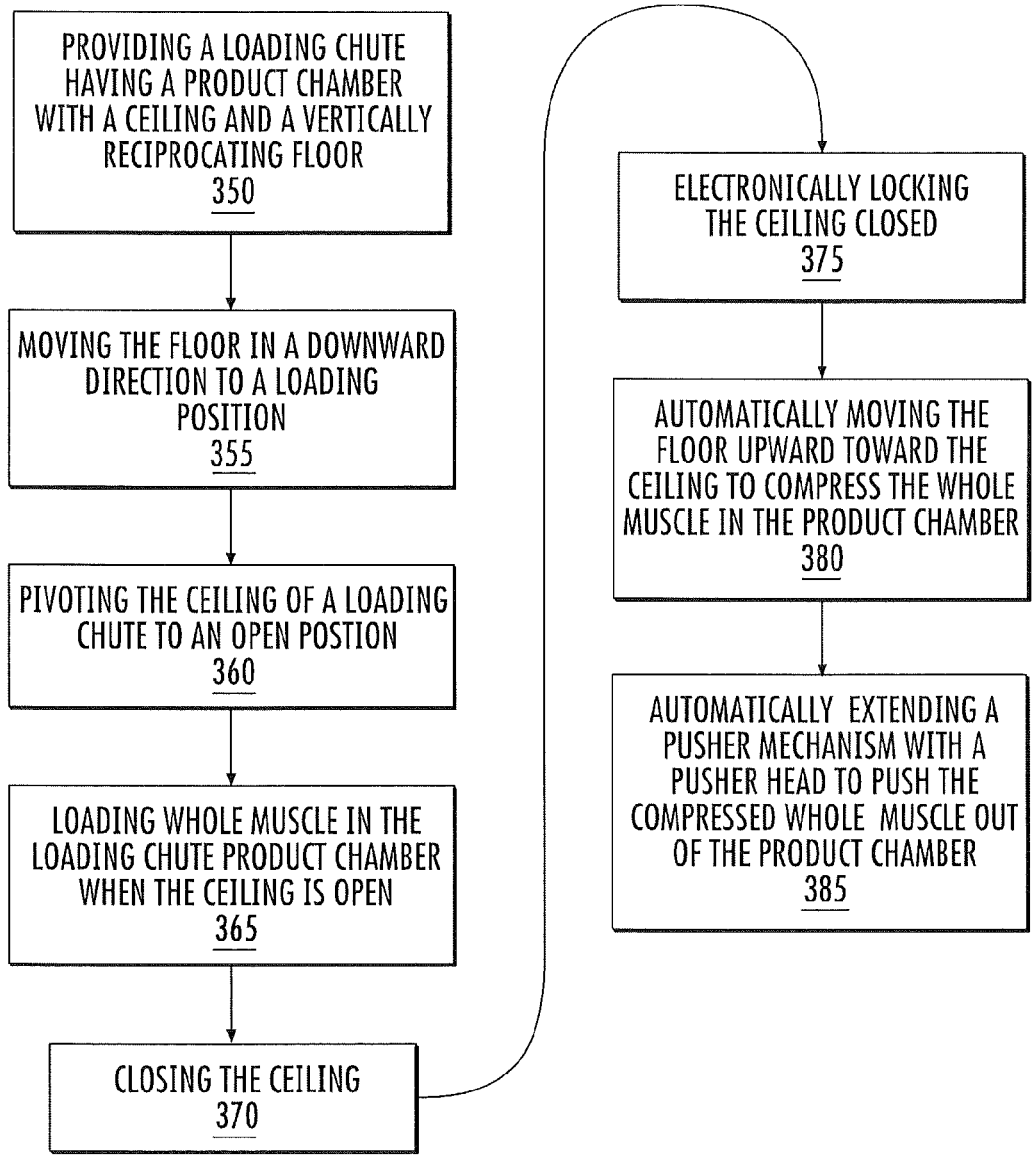

FIGS. 18-20 are flow charts of exemplary operations that can be carried out by embodiments of the present invention. FIG. 18 shows exemplary steps for a method of loading target product for packaging. The method includes: vertically moving a floor of a loading chute downward from an operative position (block 210); loading target product into the loading chute while at least a portion of a ceiling of the product chute is open (block 220); closing the ceiling of the loading chute (block 225); then programmatically directing the floor of the loading chute to move upward to close against the ceiling and define a substantially cylindrical product chamber (block 230); and compressing the target product held in the product chamber in response to directing the floor to move upward (block 235).

The method may also optionally include, after the compressing step: pushing the compressed target product through the loading chute and a product chute residing downstream thereof aligned with the loading chute (block 240); pulling netting material from an exterior surface of a netting chute enclosing the product chute to automatically enclose the compressed target product in the netting material as the object exits the product chute (block 245); and applying at least one clip to the netting material to secure the object in the netting material (block 250).

FIG. 19 shows exemplary operations or steps for another method of loading target product for packaging. The steps include: vertically extending upwardly projecting sidewalls attached to a ceiling of a loading chute from an operative position (block 300); loading target product into the loading chute while the ceiling of the product chute is open and the sidewalls are extended (block 305); closing the ceiling of the loading chute (block 310); then automatically vertically moving the sidewalls and ceiling of the loading chute downward to toward the floor to define a substantially cylindrical product chamber (block 315); and compressing the target product held in the product chamber in response to vertically moving the ceiling downward (block 320).

Optionally, the method can also include: pushing the compressed target product through the loading chute and a product chute residing downstream thereof aligned with the loading chute; pulling netting material from an exterior surface of a netting chute enclosing the product chute to automatically enclose the compressed target product in the netting material as the object exits the product chute; and applying at least one clip to the netting material to secure the object in the netting material.

FIG. 20 illustrates exemplary steps for methods of loading discrete pieces of whole muscle in a packaging system. The steps can include: providing a loading chute having a product chamber with a ceiling and a vertically reciprocating floor (block 350); moving the floor in a downward direction to a loading position (block 355); pivoting the ceiling of a loading chute to an open position (block 360); loading whole muscle in the loading chute product chamber when the ceiling is open (block 365); closing the ceiling (block 370); electronically locking the ceiling closed (block 375); then automatically moving the floor upward toward the ceiling to compress the whole muscle in the product chamber (block 380); then automatically extending a pusher mechanism with a pusher head to push the compressed whole muscle out of the product chamber (block 385).

The processes and/or methods can include manual operations (power on to system), (close housing guards), (air supply to "on") that are not shown. Many of the operations can be carried out under PLC control. That is, a controller/processor 18 (such as a Programmable Logic Controller) may be configured to automatically monitor operational status and conditions through a Safety Circuit Module.

Figure 21:
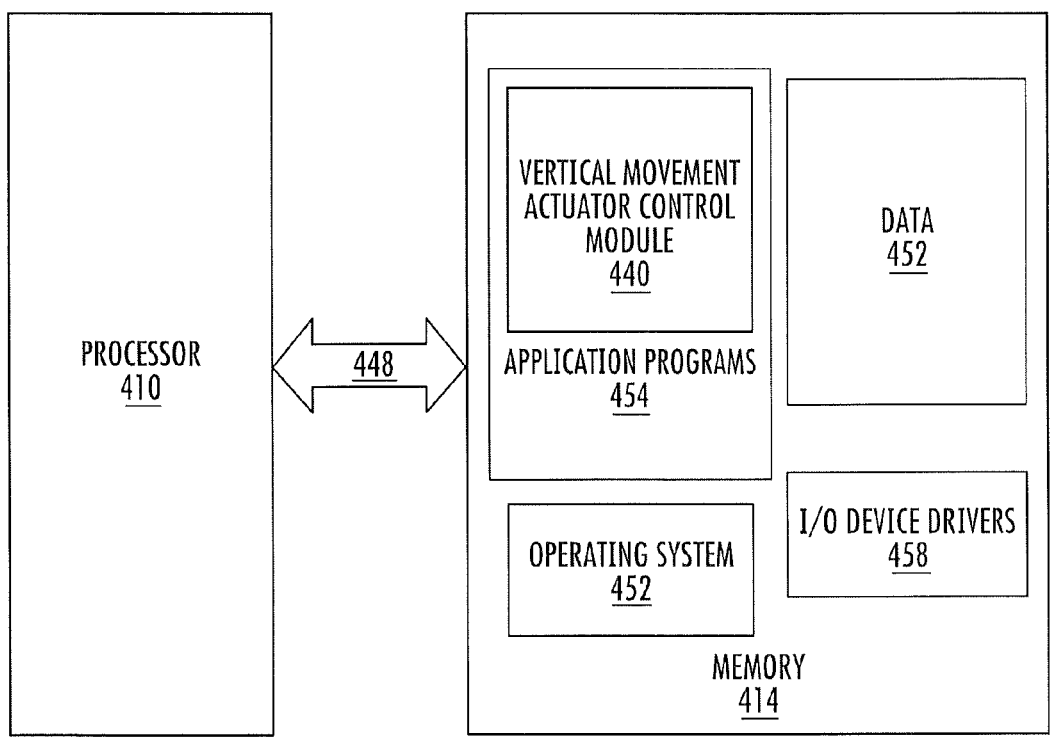
FIG. 21 is a block diagram of data processing system/computer program according to embodiments of the present invention.

FIG. 21 illustrates that the system 10 can include in-line first and second (dual) safety valves 90, 91 in communication with the pressurized air supply 93 and a safety monitoring circuit 70c in communication with a controller associated with the HMI and/or PLC. The system 10 can be configured to monitor both valves 91, 93 and cut-off or disable system operation if one of the valves 91, 93 fails.

Summarizing some embodiments, the system places the gate 75 between the pusher head 20h and chute 30 before an operator is able to open the loading door 31. Once opened, the operator loads discrete whole muscle pieces (or other product) into the loading chute 30, then closes the door 31. The system 10 automatically closes and locks the door 31, retracts the gate 75, and initiates the pushing cycle. The pusher head 20h pushes whole muscle out of the chute 35 and into netting. The clipper 50 applies clips while the pusher head is retracted. Once the pusher head clears the chute 30, the gate is extended and the door 31 is unlocked and opened, ready for an operator to reload the next set of whole muscle meat pieces in cavity.

FIG. 21 is a block diagram of exemplary embodiments of data processing systems that illustrate systems, methods, and computer program products in accordance with embodiments of the present invention. The data processing systems may be incorporated in a programmable logic controller and/or digital signal processor in communication with the HMI. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 21, the memory 414 may include several categories of software and data used in the data processing system: the operating system 452; the application programs 454; the input/output (I/O) device drivers 458; the Vertical Movement Actuator Control Module 440 which may be in communication with the data 456. The Vertical Control Module 440 can be configured to engage the vertical travel limiter (145, FIG. 7B) when a smaller loading chute is used and to direct the movement of the floor (and/or ceiling) synchronized with the retraction of the pusher, the engagement of the blocking member 50 and the like. The Module 440 can automatically and controllably direct the floor (and/or ceiling) of the loading chute to retract and extend.

The data 456 may include a look-up chart of different products (e.g., a "recipe" driven menu of operational parameters), covering material, proximity sensor feedback, cavity size (vertical movement), pressure data, safety interlock circuits and the like corresponding to particular or target products for one or more producers, which may allow additional force to cut the gathered material and/or time the cutting to a desired cycle for a shift and/or production run and the like.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and can include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Module 440 being an application program in FIG. 21, as will be appreciated by those of skill in the art, other configurations may also be utilized while still benefiting from the teachings of the present invention. For example, the Module 440 may also be incorporated into the operating system 452, the I/O device drivers 458 or other such logical division of the data processing system. Thus, the present invention should not be construed as limited to the configurations of FIG. 21 which is intended to encompass any configuration capable of carrying out the operations described herein. Further, the Module 440 can be used to operate other apparatus that may employ other chutes with or without automated pushers.

The I/O data port can be used to transfer information between the data processing system, the product pusher, the clipper to another computer system or a network (e.g., the Internet) or to other devices controlled by the processor. These components may be conventional components such as those used in many conventional data processing systems which may be configured in accordance with the present invention to operate as described herein.

The Module 440 can be configured to monitor at least one signal from a loading chute having a product chamber with a ceiling and floor, at least one of which is vertically reciprocating to allow for easier loading of product into the product chamber when the ceiling is open and automatically direct an actuator to move at least one of the ceiling or floor vertically to an operative position after signal data confirms that the ceiling is closed.

The Module 440 can be configured to direct the actuator to move the floor vertically downward to the loading position after signal data confirms that a product pusher is retracted out of the loading chamber. The Module 440 can communicate with a another module to (or may itself be configured to) automatically lock and unlock a lock operatively associated with the ceiling in a closed configuration, by directing the lock to engage before vertically moving the floor upward, directing a blocking guard to retract to allow a product pusher to enter the loading chute, then directing the lock to unlock after the floor is moved downward to the loading configuration to allow a user to open the ceiling for loading after the product pusher is retracted and the blocking guard has been extended.

While the present invention is illustrated, for example, with reference to particular divisions of programs, functions and memories, the present invention should not be construed as limited to such logical divisions. Thus, the present invention should not be construed as limited to the configuration of FIG. 21 but is intended to encompass any configuration capable of carrying out the operations described herein.

The flowcharts and block diagrams of certain of the figures herein illustrate the architecture, functionality, and operation of possible implementations of safety and/or diagnostic systems according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A loading chute for a packaging system, comprising:
   a frame;
   a ceiling with a semi-cylindrical shape configured to open and close held by the frame, wherein the ceiling semi-cylindrical shape has lower long edges along respective long sides thereof;
   a pair of spaced apart vertical sidewalls, wherein the vertical sidewalls are held by the frame and extend in a longitudinal direction, wherein one of the ceiling lower long edges is pivotably attached to an upper end portion of one of the vertical sidewalls;
   a detachable floor having a semi-cylindrical shape that corresponds to the ceiling semi-cylindrical shape underlying and in cooperating alignment with the ceiling held by the frame inside the sidewalls, wherein, in a closed operative position, the ceiling and floor are configured to abut one another to encase a product chamber with an axially extending open channel therebetween and define a portion of the product chamber in the loading position but not in the closed operative position, wherein at least one of the floor and ceiling reciprocates in a substantially vertical direction between (i) a loading position corresponding to when at least a portion of the ceiling is open while the detachable floor is detached from and spaced a distance apart from the ceiling and (ii) the closed operative position; and
   a cradle that resides under the ceiling between the vertical sidewalls and abuts a lower surface of the floor, the cradle being releasably held by the frame, wherein the cradle moves with the floor and has an arcuate upper surface,
   wherein the floor vertically reciprocates and directly contacts product in the product chamber in the closed operative position, and wherein, in the loading position, the floor resides a distance below the closed operative position of the floor.

2. A loading chute according to claim 1, wherein both the floor and ceiling vertically reciprocate such that (a) they travel away from each other substantially in concert to the loading position to expose the vertical sidewalls that reside outside of and closely spaced to an outer surface of long sides of the floor and ceiling when the ceiling is open and (b) they travel together to abut to define a substantially cylindrical product chamber in the closed operative position with the vertical sidewalls residing outside of the product chamber.

3. A loading chute according to claim 1, wherein the vertical sidewalls are stationary, and wherein the floor is configured to vertically lower and raise a distance between about 1-4 inches, and wherein, when raised, sidewalls of the floor reside between the stationary vertical sidewalls and the floor sidewalls substantially cover the stationary sidewalls.

4. A loading chute according to claim 1, wherein the floor travels vertically a defined distance between the loading and closed operative positions, wherein the sidewalls are planar and reside parallel to and laterally outside but proximate respective aligned long sides of the floor, wherein the frame is configured to serially releasably hold pairs of different size ceilings and floors that cooperate to provide different diameter size product chambers, wherein one sidewall interchangeably pivotably attaches to different size ceilings, and wherein the sidewalls are laterally adjustable on the frame to accommodate the pairs of different size ceilings and floors, and wherein a floor associated with a product diameter of about 3 inches travels between about 1 inch to about 1.5 inches and wherein a floor associated with a product diameter of about 8 inches travels a greater defined distance.

5. A loading chute for a packaging system, comprising:
   a frame;
   a ceiling with a semi-cylindrical shape configured to open and close held by the frame, wherein the ceiling semi-cylindrical shape has lower long edges along respective long sides thereof;
   a pair of spaced apart vertical sidewalls, wherein the vertical sidewalls are held by the frame and extend in a longitudinal direction, wherein one of the ceiling lower long edges is pivotably attached to an upper end portion of one of the vertical sidewalls; and
   a detachable floor having a semi-cylindrical shape that corresponds to the ceiling semi-cylindrical shape underlying and in cooperating alignment with the ceiling held by the frame inside the sidewalls, wherein, in a closed operative position, the ceiling and floor are configured to abut one another to encase a product chamber with an axially extending open channel therebetween and define a portion of the product chamber in the loading position but not in the closed operative position, wherein at least one of the floor and ceiling reciprocates in a substantially vertical direction between (i) a loading position corresponding to when at least a portion of the ceiling is open while the detachable floor is detached from and spaced a distance apart from the ceiling and (ii) the closed operative position,
   wherein the sidewalls are planar and reside parallel to and laterally outside but proximate respective aligned long sides of the floor, wherein the frame is configured to serially releasably hold pairs of different size ceilings and floors that cooperate to provide different diameter size product chambers, wherein one sidewall interchangeably pivotably attaches to different size ceilings, and wherein the sidewalls are laterally adjustable on the frame to accommodate the pairs of different size ceilings and floors.

6. A loading chute for a packaging system, comprising:
   a frame;
   a ceiling with a semi-cylindrical shape configured to open and close held by the frame, wherein the ceiling semi-cylindrical shape has lower long edges along respective long sides thereof;
   a pair of spaced apart vertical sidewalls, wherein the vertical sidewalls are held by the frame and extend in a longitudinal direction, wherein one of the ceiling lower long edges is pivotably attached to an upper end portion of one of the vertical sidewalls;
   a detachable floor having a semi-cylindrical shape that corresponds to the ceiling semi-cylindrical shape underlying and in cooperating alignment with the ceiling held by the frame inside the sidewalls, wherein, in a closed operative position, the ceiling and floor are configured to abut one another to encase a product chamber with an axially extending open channel therebetween and define a portion of the product chamber in the loading position but not in the closed operative position, wherein at least one of the floor and ceiling reciprocates in a substantially vertical direction between (i) a loading position corresponding to when at least a portion of the ceiling is open while the detachable floor is detached from and spaced a distance apart from the ceiling and (ii) the closed operative position; and
   a cradle releasably held by the frame, the cradle residing under the floor between the vertical sidewalls and travels with the floor wherein the sidewalls define a portion of the product chamber in the loading position but not in the closed operative position, wherein the frame is configured to serially releasably hold pairs of different size ceilings and floors and different size cradles, and wherein the sidewalls are laterally adjustable to reside at different lateral distances apart corresponding to different product chamber diameters provided by respective pairs of different size cooperating ceiling and floors and respective corresponding cradle.

7. A loading chute according to claim 6, further comprising an actuator residing under and in communication with the floor to be able to automatically translate the floor between the loading and closed operative positions, wherein the actuator is in communication with a linkage assembly that is attached to the floor to apply a lifting force along an angled, non-vertical orientation, and wherein the linkage assembly is in communication with a travel limiter with a mechanical stop that limits a stroke of a rod associated with the actuator that is configured to automatically allow only two different defined vertical travel distances of a respective floor corresponding to a short vertical travel distance for smaller sized pairs of ceiling and floors and a longer vertical travel distance for larger sized pairs of ceilings and floors held by the frame.

8. A loading chute according to claim 7, wherein the ceiling has a longitudinally extending pivot axis and pivots to open and close, the loading chute further comprising:
a programmatically controlled lock configured to lock the ceiling closed;
a sensor in communication with the ceiling to detect when the ceiling is closed; and
a controller in communication with the sensor, the lock and the actuator, the controller configured to direct the actuator to automatically lift the floor to the closed operative position when the ceiling is closed and locked, and to automatically direct the actuator to retract the floor to the loading position before automatically unlocking the ceiling lock.

9. A loading chute for a packaging system, comprising:
a ceiling with a semi-cylindrical shape configured to open and close;
a detachable floor having a semi-cylindrical shape that corresponds to the ceiling semi-cylindrical shape underlying and in cooperating alignment with the ceiling, wherein, in a closed operative position, the ceiling and floor are configured to abut to encase a product chamber with an axially extending open channel therebetween, wherein at least one of the floor and ceiling reciprocates in a substantially vertical direction between a loading position corresponding to when at least a portion of the ceiling is open while the detachable floor is detached from and spaced a distance apart from the ceiling and the closed operative position; and
laterally adjustable stationary sidewalls that reside on opposing outer long sides of the ceiling and floor and form part of the product chamber in the loading position and are external to the product chamber in the closed operative position.

10. A loading chute according to claim 9, wherein the ceiling is pivotably attached to an upper long side edge of one of the stationary sidewalls.

11. A loading chute for a packaging system, comprising:
a ceiling having a semi-cylindrical shape with spaced apart first and second long sides having respective bottom edges;
a floor that is detachable from the ceiling having a semi-cylindrical shape underlying and in cooperating alignment with the ceiling, the floor having spaced apart first and second long sides with top edges that face the ceiling bottom edges; and
first and second vertically extending parallel sidewalls, the first and second vertically extending parallel sidewalls residing adjacent to and outside of respective spaced apart long sides of the ceiling and floor, wherein the bottom edge of the first long side of the ceiling is pivotably attached to an upper portion of the first sidewall;
wherein at least one of the floor or ceiling reciprocates in a substantially straight up and down vertical direction between (i) a loading position corresponding to when the ceiling is open and the first and second sidewalls cooperate with the floor to reside between the floor and the ceiling and form part of an open product chamber and (ii) a closed operative position corresponding to when the ceiling is closed and the floor and ceiling are in abutting contact to define a closed product chamber with the vertically extending sidewalls residing outside of the closed product chamber,
wherein the floor is in communication with at least one actuator that is configured to cause the floor to reciprocate between the loading and operative positions while the bottom edge of the first long side of the ceiling is stationary,
wherein the actuator is configured to contact a linkage assembly attached to the floor to move the floor between the loading and closed positions, wherein the linkage assembly is attached to the floor to apply a lifting force along an angled, non-vertical orientation, and wherein the linkage assembly is in communication with a travel limiter with a mechanical stop that limits a stroke of a rod associated with the actuator that is configured to automatically allow two different defined vertical travel distances of a respective floor corresponding to a short vertical travel distance for smaller sized pairs of ceiling and floors and a longer vertical travel distance for larger sized pairs of ceilings and floors held by the frame.

12. The loading chute of claim 11, wherein the bottom edge of the first long side of the ceiling that is pivotably attached to an upper portion of the first sidewall is pivotably attached to an upper edge of the first sidewall.

13. A loading chute for a packaging system, comprising:
a ceiling having a semi-cylindrical shape with spaced apart first and second long sides having respective bottom edges;
a floor that is detachable from the ceiling having a semi-cylindrical shape underlying and in cooperating alignment with the ceiling, the floor having spaced apart first and second long sides with top edges that face the ceiling bottom edges; and
first and second vertically extending parallel sidewalls, the first and second vertically extending parallel sidewalls residing adjacent to and outside of respective spaced apart long sides of the ceiling and floor, wherein the bottom edge of the first long side of the ceiling is pivotably attached to an upper portion of the first sidewall;
wherein at least one of the floor or ceiling reciprocates in a substantially straight up and down vertical direction between (i) a loading position corresponding to when the ceiling is open and the first and second sidewalls cooperate with the floor to reside between the floor and the ceiling and form part of an open product chamber and (ii) a closed operative position corresponding to when the ceiling is closed and the floor and ceiling are in abutting contact to define a closed product chamber with the vertically extending sidewalls residing outside of the closed product chamber, wherein the first and second vertically extending sidewalls are planar and attached to a frame and are laterally movable to define different defined distances therebetween to thereby accommodate different size ceilings and floors, and wherein the frame and vertically extending sidewalls are configured to releasably attach pairs of different size ceilings and floors.

14. A loading chute for a packaging system, comprising:
a frame;
a ceiling with a semi-cylindrical shape configured to open and close held by the frame, wherein the ceiling semi-cylindrical shape has lower long edges along respective long sides thereof;
a pair of spaced apart vertical sidewalls, wherein the vertical sidewalls are held by the frame and extend in a longitudinal direction, wherein one of the ceiling lower long edges is pivotably attached to an upper end portion of one of the vertical sidewalls; and
a detachable floor having a semi-cylindrical shape that corresponds to the ceiling semi-cylindrical shape underlying and in cooperating alignment with the ceiling held by the frame inside the sidewalls, wherein, in a closed operative position, the ceiling and floor are configured to abut one another to encase a product chamber with an axially extending open channel therebetween and define a portion of the product chamber in the loading position but not in the closed operative position, wherein at least one of the floor and ceiling reciprocates in a substantially vertical direction between (i) a loading position corresponding to when at least a portion of the ceiling is open while the detachable floor is detached from and spaced a distance apart from the ceiling and (ii) the closed operative position, wherein the floor vertically reciprocates, and wherein the loading chute further comprises a lift assembly that is attached to the floor in communication with an actuator that vertically raises and lowers the floor a defined distance, and wherein the lift assembly further comprises a travel limiter to controllably allow at least two different defined vertical travel distances of the floor corresponding to a first short vertical travel distance for smaller sized pairs of ceiling and floors and a second longer vertical travel distance for larger sized pairs of ceilings and floors held by the frame thereby allowing a smaller travel when a small diameter loading chute is in position relative to when a large diameter chute is in position.

15. A loading chute for a packaging system, comprising:
a ceiling having a semi-cylindrical shape with spaced apart first and second long sides having respective bottom edges;
a floor that is detachable from the ceiling having a semi-cylindrical shape underlying and in cooperating alignment with the ceiling, the floor having spaced apart first and second long sides with top edges that face the ceiling bottom edges; and
first and second vertically extending parallel sidewalls, the first and second vertically extending parallel sidewalls residing adjacent to and outside of respective spaced apart long sides of the ceiling and floor, wherein the bottom edge of the first long side of the ceiling is pivotably attached to an upper portion of the first sidewall;
wherein at least one of the floor or ceiling reciprocates in a substantially straight up and down vertical direction between (j) a loading position corresponding to when the ceiling is open and the first and second sidewalls cooperate with the floor to reside between the floor and the ceiling and form part of an open product chamber and (ii) a closed operative position corresponding to when the ceiling is closed and the floor and ceiling are in abutting contact to define a closed product chamber with the vertically extending sidewalls residing outside of the closed product chamber, wherein the first and second vertically extending sidewalls are attached to a frame and are laterally movable to define different defined distances therebetween, the loading chute further comprising a cradle held by the frame under the floor between the first and second sidewalls, the cradle having an arcuate upper surface that is configured to move up and down with the floor, and wherein the frame and vertically extending sidewalls are configured to releasably attach pairs of different size ceilings and floors and a correspondingly sized cradle.

16. A loading chute for a packaging system, comprising:
a frame;
first and second vertically extending parallel sidewalls held by the frame to be able to be laterally spaced apart at different distances;
a ceiling having a semi-cylindrical shape with laterally spaced apart first and second long sides having respective bottom edges;
a floor that is detachable from the ceiling having a semi-cylindrical shape underlying and in cooperating alignment with the ceiling, the floor having spaced apart first and second long sides with top edges that face the ceiling bottom edges, wherein the floor resides adjacent to and between the first and second sidewalls;
a cradle releasably attachable to the frame, the cradle residing under the floor between the first and second sidewalls, wherein the cradle holds the floor; and
at least one actuator attached to the cradle configured to move the cradle with the floor held therein up and down, wherein the floor reciprocates in a substantially straight up and down vertical direction between (i) a loading position corresponding to when the ceiling is open and the first and second sidewalls cooperate with the floor to reside between the floor and the ceiling and form part of an open product chamber and (ii) a closed operative position corresponding to when the ceiling is closed and the floor and ceiling are in abutting contact to define a closed product chamber with the vertically extending sidewalls residing outside of the closed product chamber, and
wherein the frame is configured to serially releasably hold pairs of different size ceilings and floors and a correspondingly sized cradle, and wherein the cradles of respective pairs of ceilings and floor vary in width and height.

17. The loading chute of claim 16, wherein the sidewalls are laterally adjustable to reside at different lateral distances apart corresponding to different product chamber diameters provided by respective pairs of different size cooperating ceiling and floors and respective corresponding cradle.

18. The loading chute of claim 16, wherein the bottom edge of the first long side of a respective ceiling is pivotably attachable to an upper portion of the first sidewall, wherein the first and second sidewalls are stationary, and wherein the frame comprises laterally extending cross bars that can position the sidewalls at desired lateral positions to thereby provide and adjustably sized space therebetween.

19. The loading chute of claim 17, wherein the first sidewall interchangeably pivotably attaches to different size ceilings of respective ceiling and floor pairs, and wherein the cradle has an arcuate upper surface that abuts the floor.

* * * * *

UNITED STATES PATENT AND TRADEMARK OFFICE
CERTIFICATE OF CORRECTION

PATENT NO.       : 8,746,432 B2                                Page 1 of 1
APPLICATION NO.  : 12/777614
DATED            : June 10, 2014
INVENTOR(S)      : May et al.

It is certified that error appears in the above-identified patent and that said Letters Patent is hereby corrected as shown below:

In the Claims:
Column 23, Claim 15, Line 67: correct "between (j)"
to read -- between (i) --

Signed and Sealed this
Thirtieth Day of December, 2014

Michelle K. Lee
*Deputy Director of the United States Patent and Trademark Office*